United States Patent
Geisner et al.

(10) Patent No.: US 9,053,483 B2
(45) Date of Patent: Jun. 9, 2015

(54) PERSONAL AUDIO/VISUAL SYSTEM PROVIDING ALLERGY AWARENESS

(75) Inventors: Kevin A Geisner, Mercer Island, WA (US); Kathryn Stonw Perez, Kirkland, WA (US); Stephen G Latta, Seattle, WA (US); Ben J Sugden, Woodinville, WA (US); Benjamin I Vaught, Seattle, WA (US); Alex Aben-Athar Kipman, Redmond, WA (US); Cameron G Brown, Redmond, WA (US); Holly A Hirzel, Kirkland, WA (US); Brian J Mount, Seattle, WA (US); Daniel McCulloch, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 246 days.

(21) Appl. No.: 13/436,526

(22) Filed: Mar. 30, 2012

(65) Prior Publication Data

US 2013/0085345 A1    Apr. 4, 2013

Related U.S. Application Data

(63) Continuation-in-part of application No. 13/250,878, filed on Sep. 30, 2011.

(51) Int. Cl.
*G09G 5/00* (2006.01)
*G06Q 30/00* (2012.01)
*G02B 27/01* (2006.01)

(52) U.S. Cl.
CPC .............. *G06Q 30/00* (2013.01); *G02B 27/017* (2013.01); *G02B 2027/0138* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 7,693,702 B1 | 4/2010 | Kerner et al. | |
| 8,432,489 B2 | 4/2013 | Arseneau et al. | |
| 2005/0113649 A1* | 5/2005 | Bergantino | 600/300 |
| 2006/0230108 A1 | 10/2006 | Tatsuta et al. | |

(Continued)

OTHER PUBLICATIONS

Valkkynen, et al., "Mobile Augmented Reality for Retail Environments", in Mobile HCI Workshop on Mobile Interaction in Retail Environments, Aug. 30, 2011, 4 pages.

Joutou, Taichi, et al., "A Food Image Recognition System With Multiple Kernel Learning," 16th IEEE International Conference on Image Processing, Nov. 2009, 4 pages.

(Continued)

*Primary Examiner* — Phi Hoang
*Assistant Examiner* — Mohammad H Akhavannik
(74) *Attorney, Agent, or Firm* — Micah Goldsmith; Judy Yee; Micky Minhas

(57) ABSTRACT

A system provides a recommendation of food items to a user based on nutritional preferences of the user, using a head-mounted display device (HMDD) worn by the user. In a store, a forward-facing camera of the HMDD captures an image of a food item. The food item can be identified by the image, such as based on packaging of the food item. Nutritional parameters of the food item are compared to nutritional preferences of the user to determine whether the food item is recommended. The HMDD displays an augmented reality image to the user indicating whether the food item is recommended. If the food item is not recommended, a substitute food item can be identified. The nutritional preferences can indicate food allergies, preferences for low calorie foods and so forth. In a restaurant, the HMDD can recommend menu selections for a user.

16 Claims, 32 Drawing Sheets

(56) References Cited

U.S. PATENT DOCUMENTS

| | | |
|---|---|---|
| 2006/0230123 A1 | 10/2006 | Simmons et al. |
| 2007/0088746 A1 | 4/2007 | Baker |
| 2008/0073430 A1 | 3/2008 | Sickenius |
| 2008/0082465 A1 | 4/2008 | Meijer et al. |
| 2009/0144081 A1 | 6/2009 | Harlan |
| 2009/0265381 A1 | 10/2009 | Canu et al. |
| 2010/0199232 A1 | 8/2010 | Mistry et al. |
| 2010/0238161 A1 | 9/2010 | Varga et al. |
| 2010/0257252 A1 | 10/2010 | Dougherty et al. |
| 2011/0112904 A1* | 5/2011 | Stupp ......................... 705/14.58 |
| 2011/0218839 A1 | 9/2011 | Shamaiengar |
| 2011/0221656 A1 | 9/2011 | Haddick et al. |
| 2011/0221793 A1 | 9/2011 | King, III et al. |
| 2011/0270135 A1 | 11/2011 | Dooley et al. |
| 2011/0318717 A1* | 12/2011 | Adamowicz .................. 434/127 |
| 2012/0005222 A1* | 1/2012 | Bhagwan et al. ............. 707/769 |
| 2012/0072302 A1* | 3/2012 | Chen et al. .................... 705/26.7 |
| 2012/0178065 A1 | 7/2012 | Naghavi et al. |
| 2012/0179665 A1 | 7/2012 | Baarman et al. |
| 2012/0233002 A1* | 9/2012 | Abujbara ........................ 705/15 |
| 2013/0085345 A1 | 4/2013 | Geisner et al. |

OTHER PUBLICATIONS

Winlock, Tess, et al., "Toward Real-Time Grocery Detection for the Visually Impaired," IEEE Computer Society Conference on Computer Vision and Pattern Recognition Workshops, Jun. 2010, 8 pages.

Non-final Office Action dated Jul. 26, 2013, U.S. Appl. No. 13/250,878 filed Sep. 30, 2011.

Response to Office Action dated Oct. 17, 2013, U.S. Appl. No. 13/250,878 filed Sep. 30, 2011.

Non-final Office Action dated Feb. 4, 2014, U.S. Appl. No. 13/250,878 filed Sep. 30, 2011.

Response to Office Action dated May 2, 2014, U.S. Appl. No. 13/250,878, filed Sep. 30, 2011.

Non-Final Office Action dated May 21, 2014, U.S. Appl. No. 13/250,878, filed Sep. 30, 2011.

Final Office Action dated Nov. 21, 2014, U.S. Appl. No. 13/250,878, filed Sep. 30, 2011.

Non-final Office Action dated Oct. 15, 2014, U.S. Appl. No. 13/689,293, filed Nov. 29, 2012.

Response to Office Action dated Feb. 14, 2015, U.S. Appl. No. 13/250,878, filed Sep. 30, 2011.

* cited by examiner

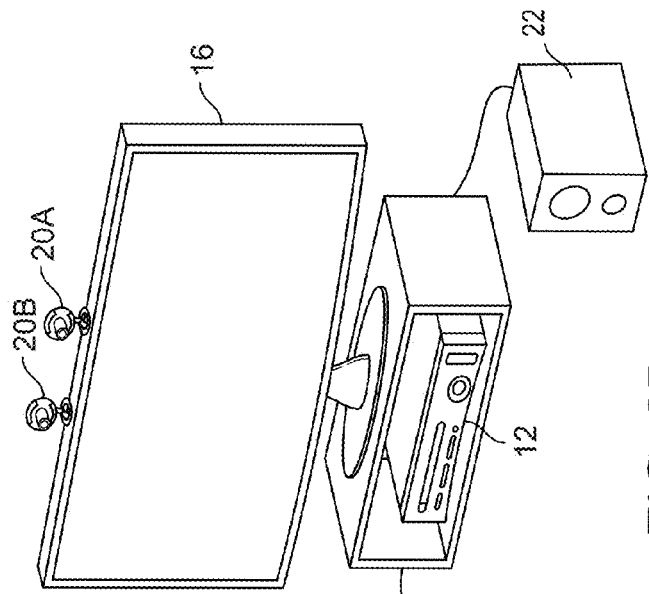
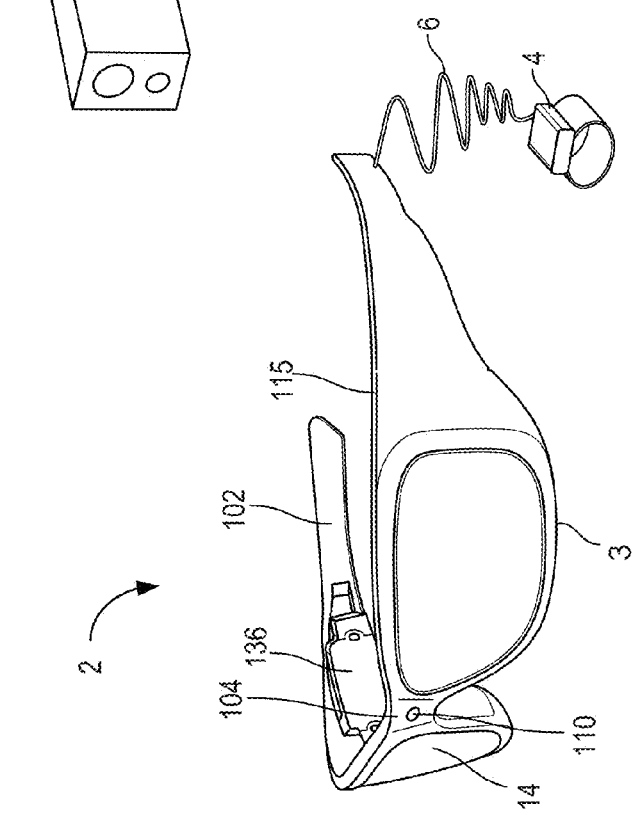
FIG. 2B
FIG. 2A

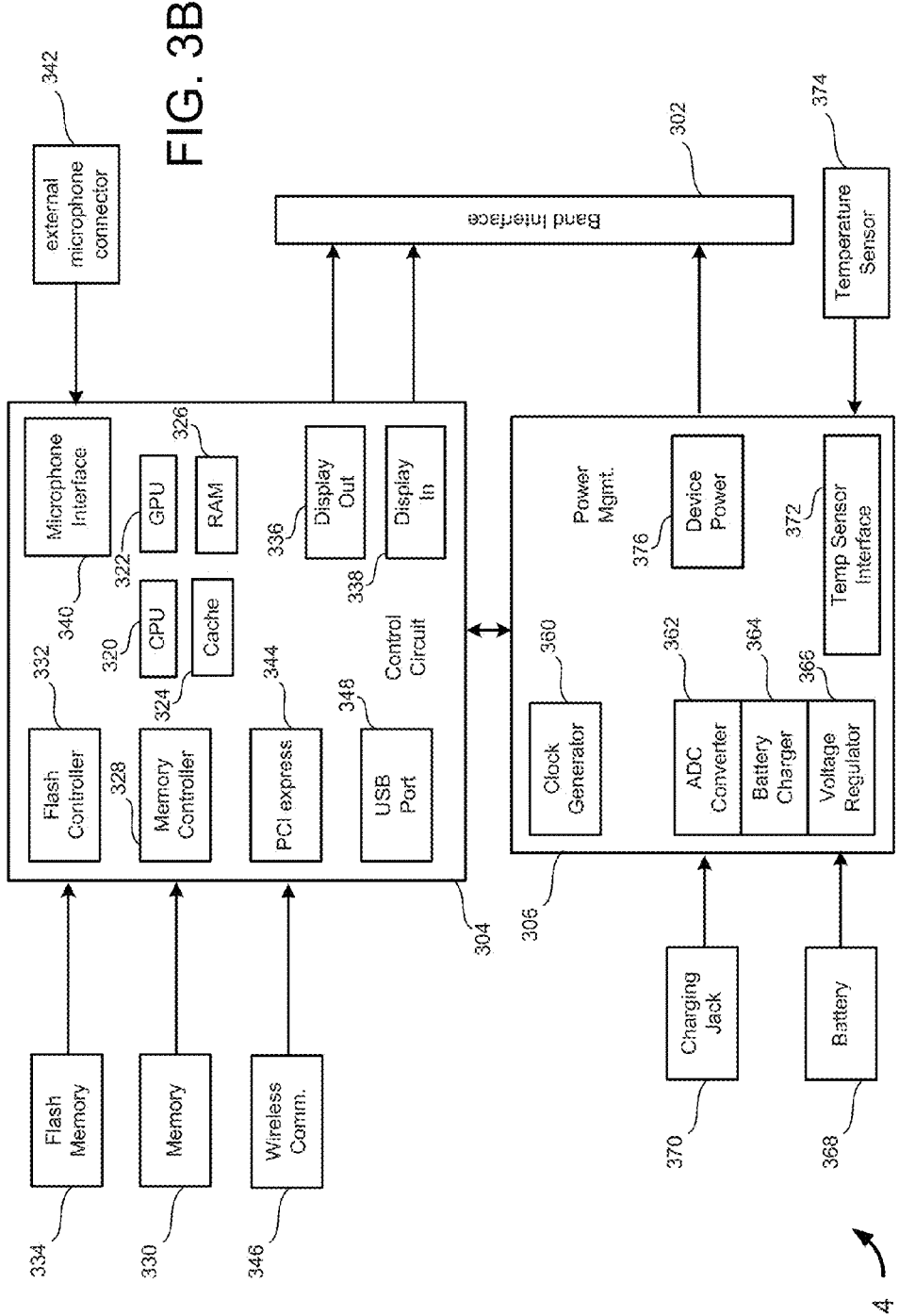

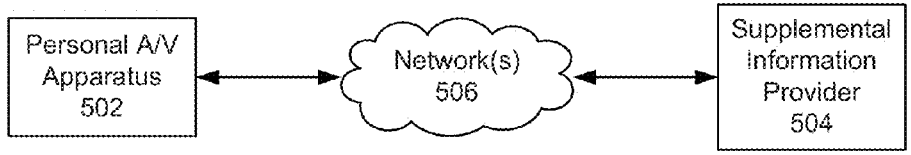
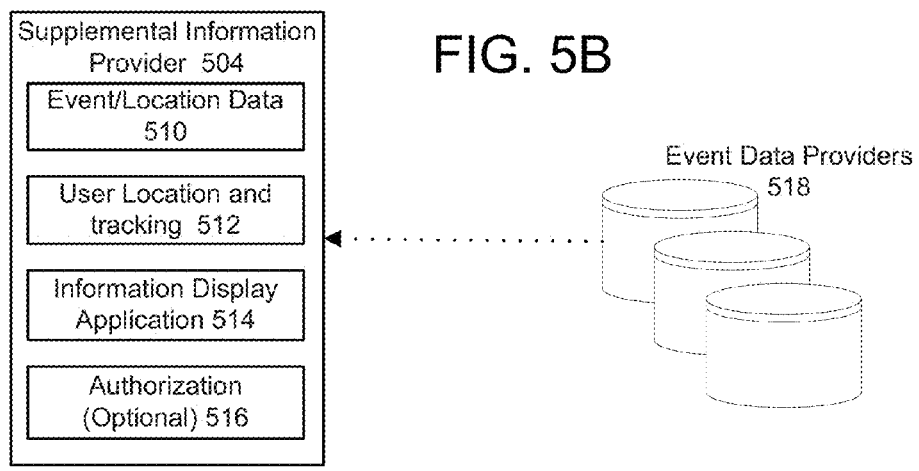
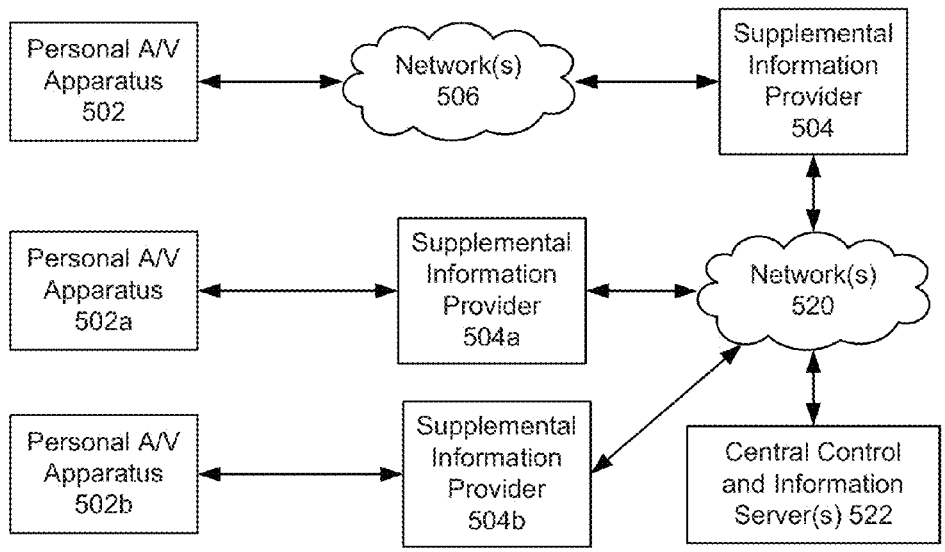

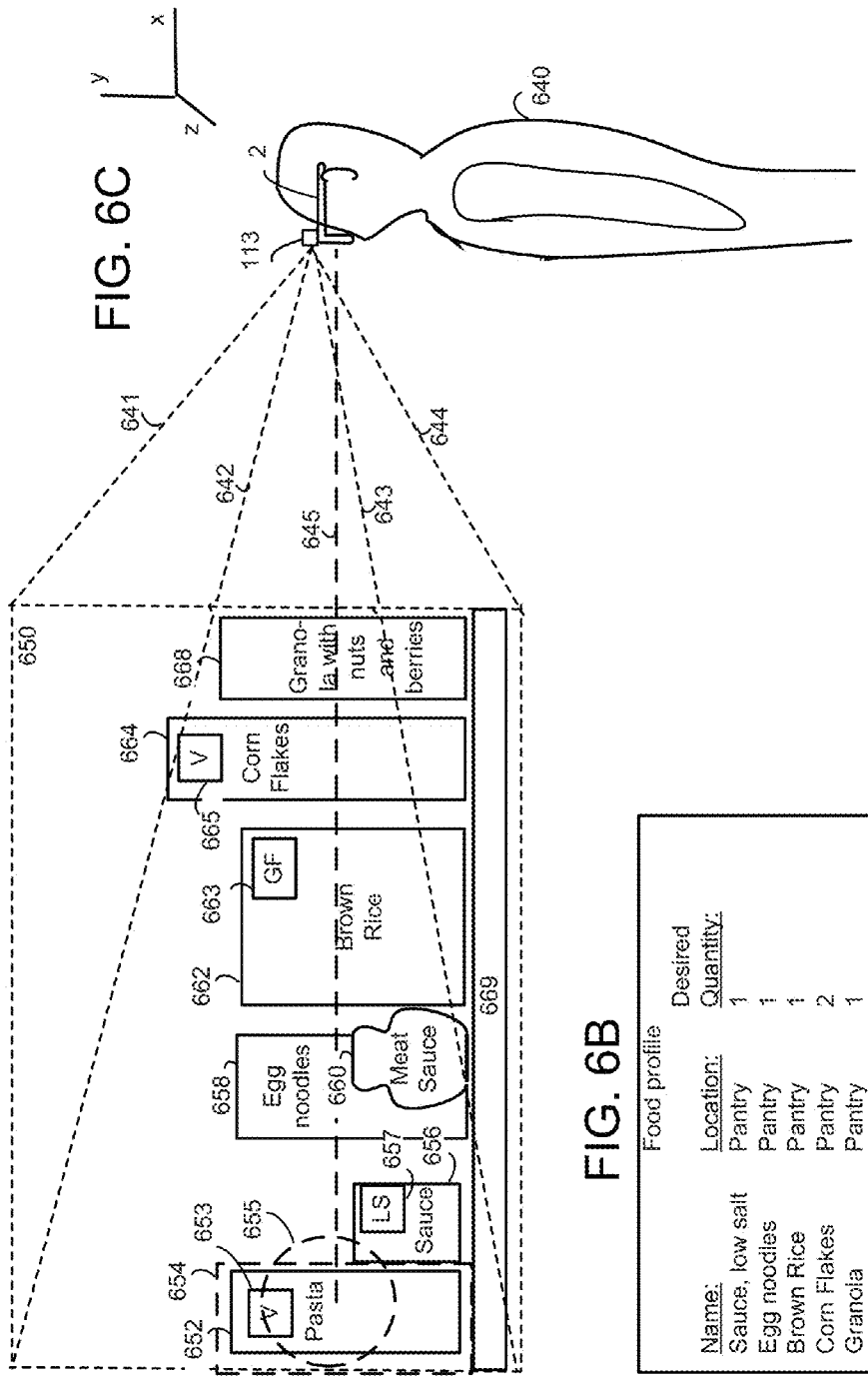

FIG. 6D

Image data

| Product id: | Image file: |
|---|---|
| UPC10 | UPC10.file |
| UPC11 | UPC11.file |
| UPC12 | UPC12.file |
| UPC13 | UPC13.file |
| UPC14 | UPC14.file |
| UPC15 | UPC15.file |
| UPC16 | UPC16.file |
| UPC17 | UPC17.file |
| UPC18 | UPC18.file |
| Apple | Apple.file |
| Orange | Banana.file |

FIG. 6E

Shopping List

| Name: | Quantity: | Description: | Location: |
|---|---|---|---|
| Corn Flakes | 1 | Boxed goods | Pantry |
| Canned Beans | 1 | canned goods | Pantry |

FIG. 6F

Food inventory

| Product id: | Name: | Location: | Desired Quantity: | Detected Quantity: | Quantity Needed: |
|---|---|---|---|---|---|
| UPC10 | Sauce, low salt | Pantry | 1 | 1 | 0 |
| UPC11 | Egg noodles | Pantry | 1 | 1 | 0 |
| UPC12 | Brown Rice | Pantry | 1 | 1 | 0 |
| UPC13 | Corn Flakes | Pantry | 2 | 1 | 1 |
| UPC14 | Granola | Pantry | 1 | 0 | 0 |
| UPC15 | Canned Beans | Pantry | 1 | 1 | 1 |
| UPC16 | Pasta | Pantry | 1 | 1 | 0 |
| UPC17 | Sauce, meat | Pantry | 1 | 1 | 0 |
| UPC18 | Coffee | Cupboard | 1 | 1 | 0 |

| Food Profiles | | |
|---|---|---|
| Name: | Likes: | Dislikes: |
| Jim (host) | Pasta | Shellfish |
| Sue (guest) | Vegetables | Anchovies |
| Joe (guest) | Pasta, Steak | Broccoli |

Recipe for Egg Noodles

Ingredients:           Location:
Egg noodles, 1 lb.     Pantry
Sauce, meat, 1 jar.    Pantry
Basil, 1 bunch         Missing/Unknown Directions: Boil noodles 5 min., add sauce, sprinkle with basil

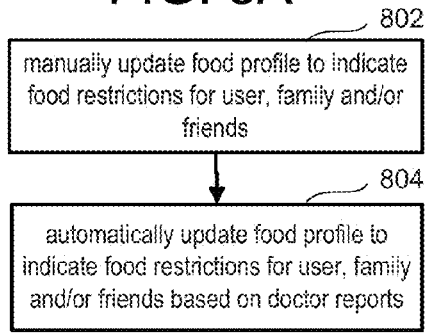
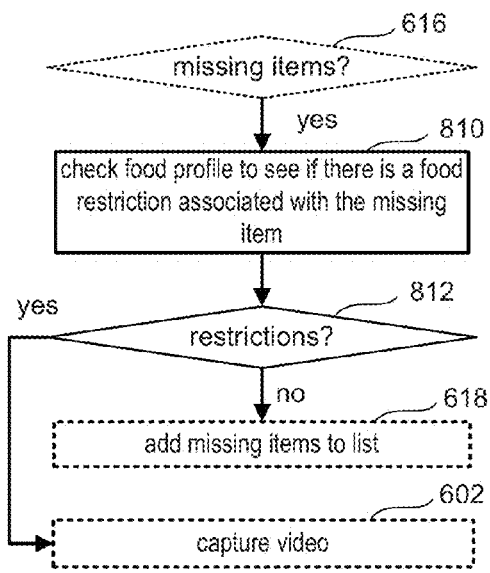
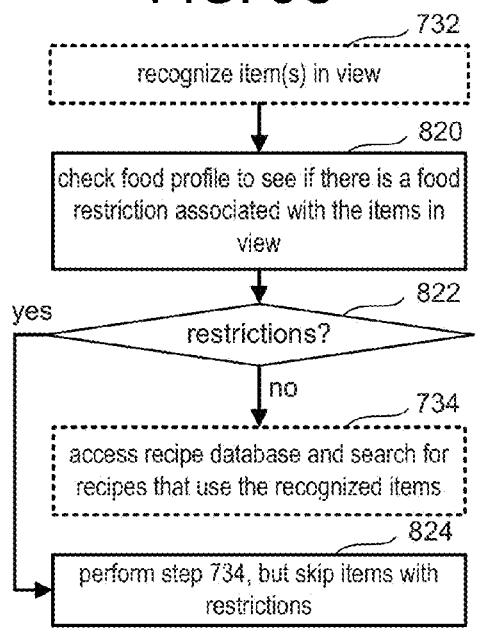

FIG. 8D
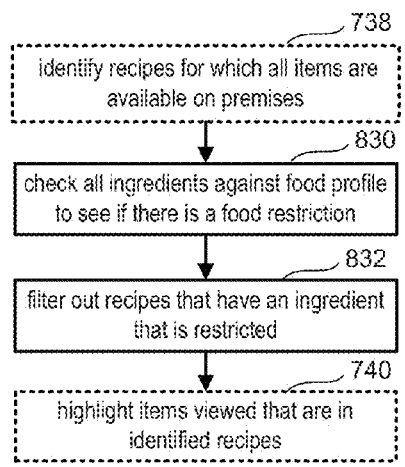
FIG. 8E
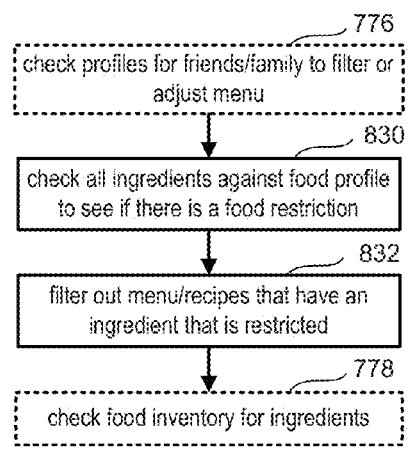
| | Food profile | | Allergen | Associated |
|---|---|---|---|---|
| User: | Preferences/restrictions: | Allergen: | severity: | user: |
| Jim | low salt, heart healthy, nut allergy | Nuts | high | Sue |
| Sue | vegan | | | Jim |
| Joe | lactose intolerance | | | |
Fig. 8F

FIG. 8G

Nutritional Parameters

| Product id: | Name: | Ingredients: | Compatible with: | Incompatible with: |
|---|---|---|---|---|
| UPC10 | Sauce, low salt | tomatoes, oil, sugar | Vegan, low salt | |
| UPC11 | Egg noodles | flour, water, egg, salt, butter | n/a | Vegan, low salt, heart healthy |
| UPC12 | Brown rice | brown rice | Vegan, low salt, heart healthy, gluten-free | |
| UPC13 | Corn flakes | milled corn, sugar, malt flavoring, salt | Vegan, heart healthy | Low salt, gluten free |
| UPC14 | Granola | rolled oats, nuts, berries, honey, salt | Vegan | gluten-free, nut allergy |
| UPC15 | Canned beans | white beans, water, salt | Vegan, heart healthy | n/a |
| UPC16 | Pasta | wheat flour, water | Vegan, heart healthy, low salt | n/a |
| UPC17 | Sauce, meat | tomatoes, meat, oil, salt, sugar | n/a | Vegan, vegetarian, heart healthy, low salt |
| UPC18 | Coffee | Arabica coffee | Vegan, heart healthy, low salt | |

FIG. 8H

Recipe for Vegan Pasta

Ingredients:     Location:
Pasta (vegan), 1 lb.     Pantry
Sauce (low salt), 1 can.     Pantry
Basil, 1 bunch     Missing/Unknown Directions: Cook pasta al dente, add sauce, sprinkle with basil

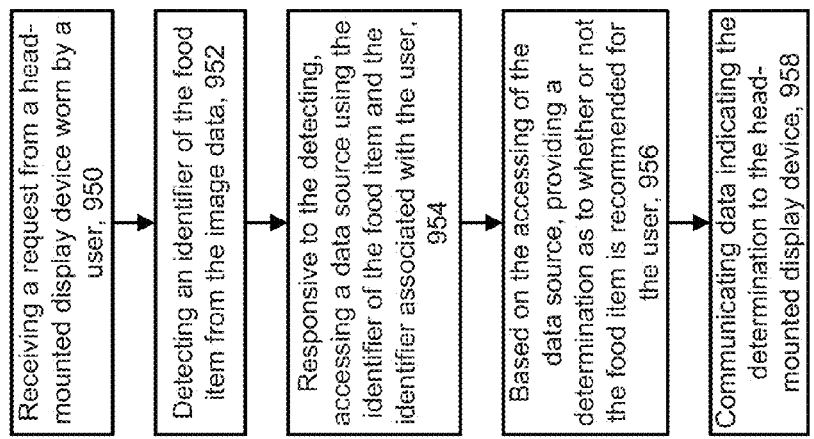
FIG. 9A2
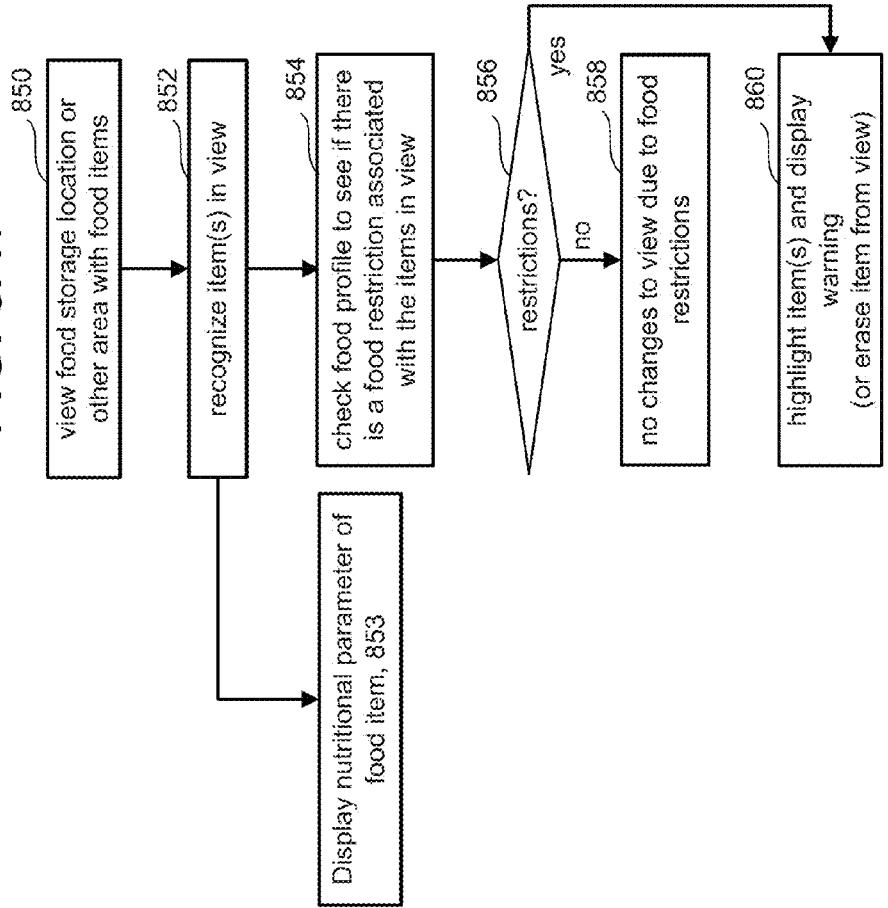
FIG. 9A1

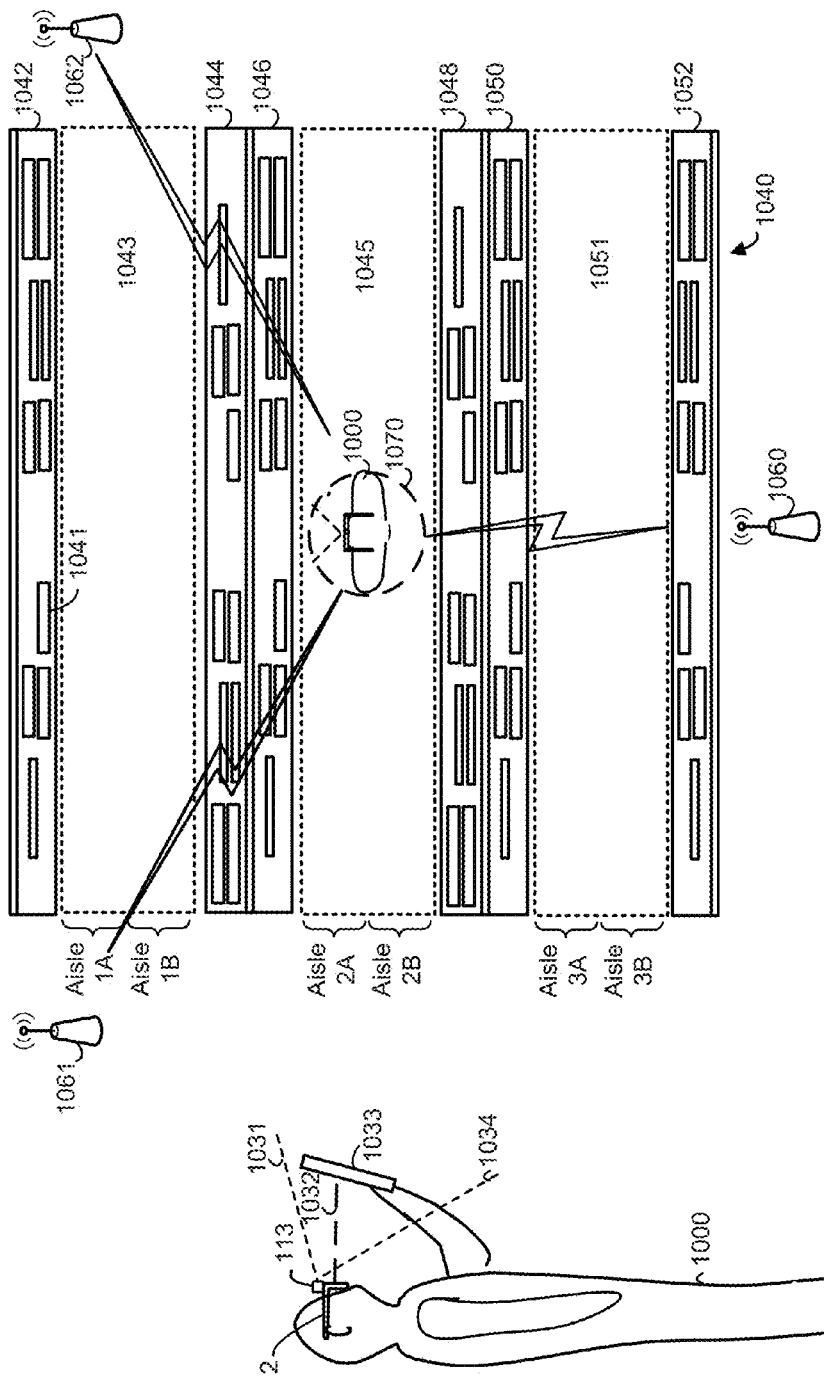

FIG. 11A

Inventory data

| Store id: | Store Location: | Product Id: | Name: | Logo id: | Location In Store: |
|---|---|---|---|---|---|
| SID1 | SL1 | UPC1 | Cake mix A | V | Aisle 2A |
| | | UPC2 | Cake mix B | | Aisle 2A |
| | | UPC3 | Cake mix C | | Aisle 2A |
| | | UPC4 | Cake mix D | HH | Aisle 2A |
| | | UPC5 | Muffin mix A | LS | Aisle 2A |
| | | UPC6 | Muffin mix B | | Aisle 2A |
| | | UPC7 | Cookie mix | | Aisle 3A |
| SID2 | SL2 | UPC1 | Cake mix A | V | Aisle 4A |
| | | UPC3 | Cake mix C | | Aisle 4A |
| | | UPC6 | Muffin mix B | | Aisle 4B |
| | | Apple1 | Apple, red | | Aisle 1A |
| | | Orange | orange | | Aisle 1A |

FIG. 11B

Nutritional Parameters

| Product Id: | Ingredients: | Compatible with: | Incompatible with: |
|---|---|---|---|
| UPC1 | enriched flour, sugar, flavoring, baking powder, salt | Vegan | Low salt, heart healthy |
| UPC2 | enriched flour, sugar, eggs, oil, salt | n/a | Vegan, low salt, heart healthy |
| UPC3 | enriched flour, sugar, eggs, sugar, salt | Organic | Vegan, low salt, heart healthy |
| UPC4 | whole wheat flour, sugar, milk, salt | Heart healthy | Vegan, low salt |
| UPC5 | enriched flour, sugar, eggs | Low salt | Vegan, heart healthy |
| UPC6 | enriched flour, sugar, eggs, oil, salt, peanuts | n/a | Vegan, low salt, heart healthy, nut allergy |
| UPC7 | enriched flour, sugar, oil, salt | Vegan | low salt, heart healthy |

FIG. 11C

Image data

| Product id: | Image file: |
|---|---|
| UPC1 | UPC1.file |
| UPC2 | UPC2.file |
| UPC3 | UPC3.file |
| UPC4 | UPC4.file |
| UPC5 | UPC5.file |
| UPC6 | UPC6.file |
| UPC7 | UPC7.file |
| Apple1 | apple1.file |
| Orange | orange.file |

FIG. 11D

| Logo id: | Logo image file: | Description: |
|---|---|---|
| V | V.file1, V.file2 | Vegan |
| HH | HH.file | Heart Healthy |
| LS | LS.file | Low sodium |
| KO | KO.file | Kosher |
| LC | LC.file | Low calorie |
| WG | WG.file | Whole Grain |
| VG | VG.file | Vegetarian |
| OR | OR.file | Organic |
| FF | FF.file | Fat-Free |
| SF | SF.file | Sugar-Free |
| NF | NF.file | Nut-Free |
| WF | WF.file | Wheat-Free |
| GF | GF.file | Gluten-free |
| HF | HF.file | High fiber |
| FT | FT.file | Fair Trade |
| WA | WA.file | WALMART® Great For You |
| ER | SA.file | Safeway® Eating Right! |
| HC | HC.file | Health CheckTM, Heart and Stroke Foundation |

Logo image data

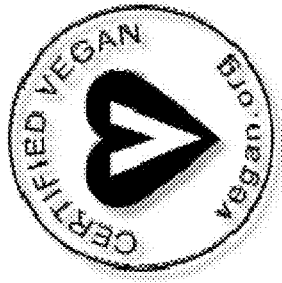

FIG. 11E

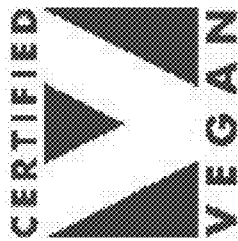

FIG. 11F

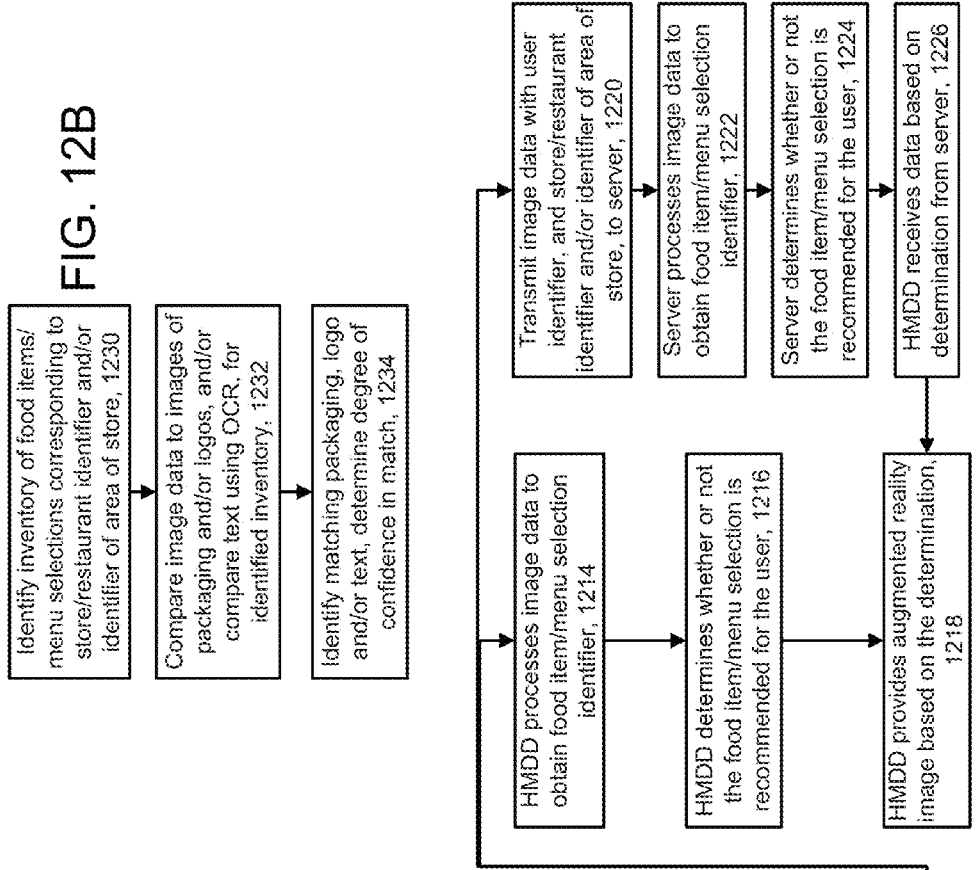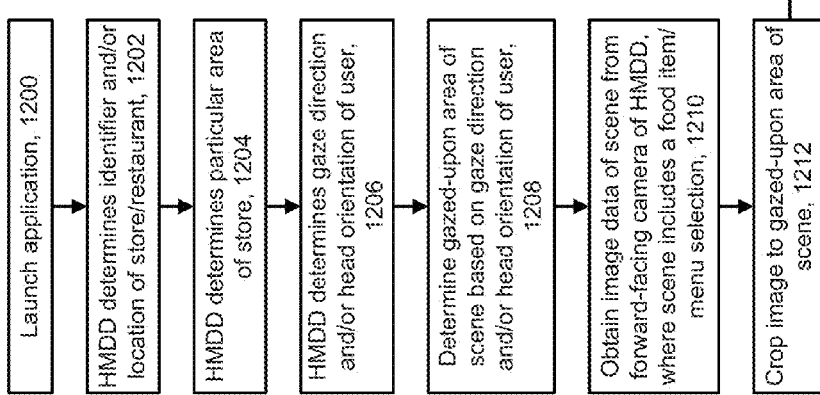

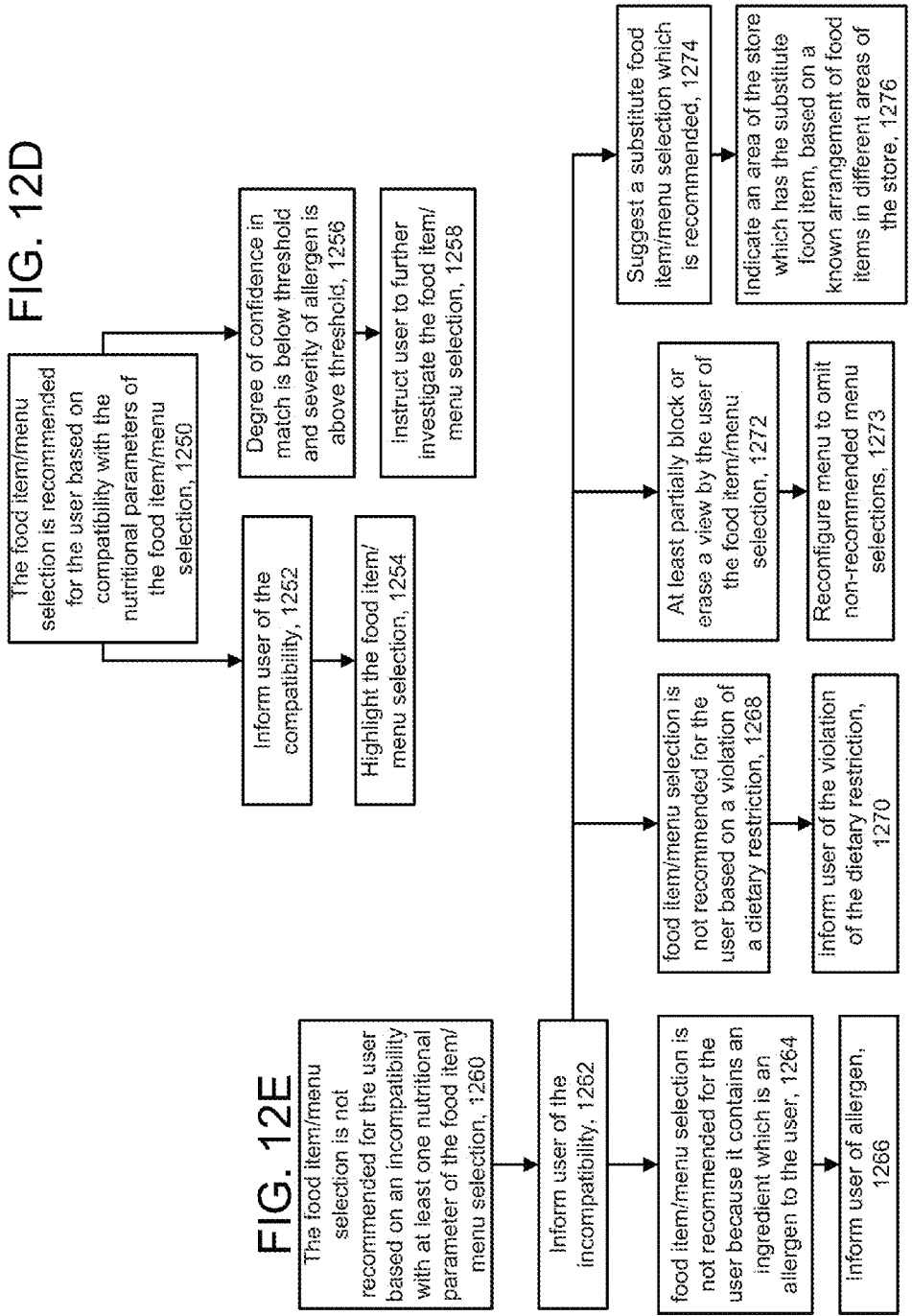

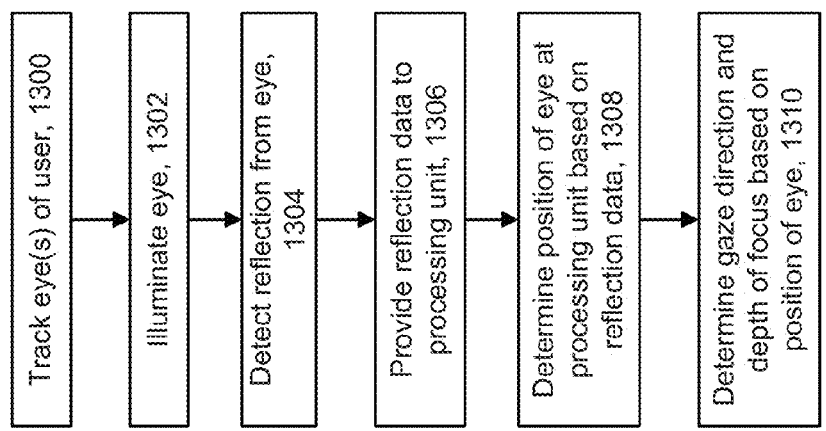

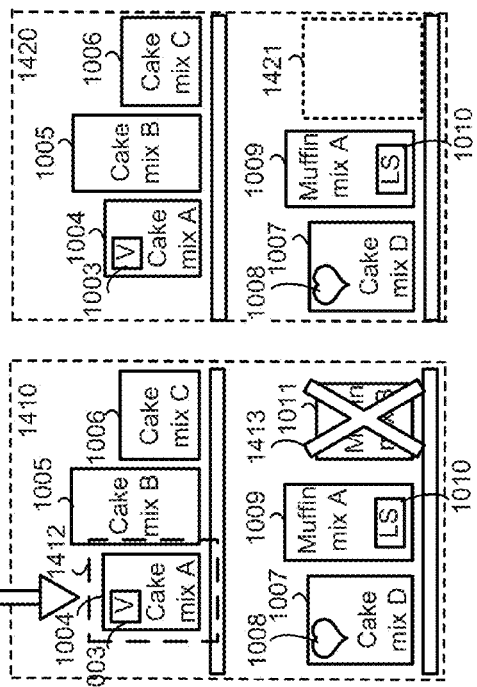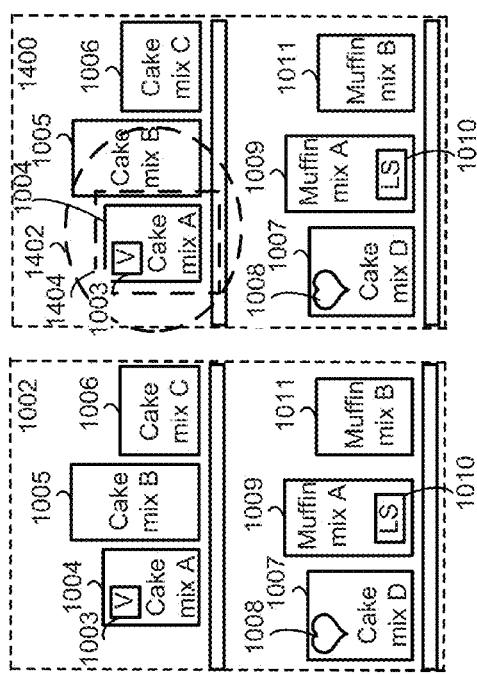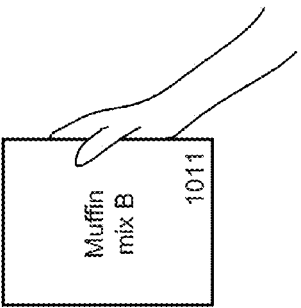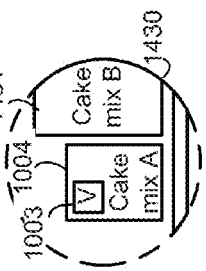

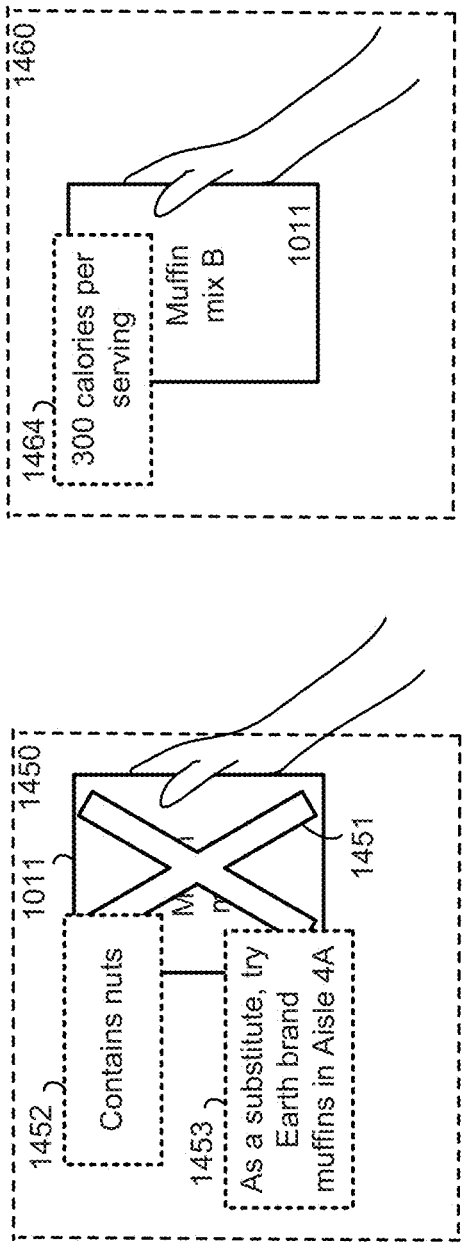

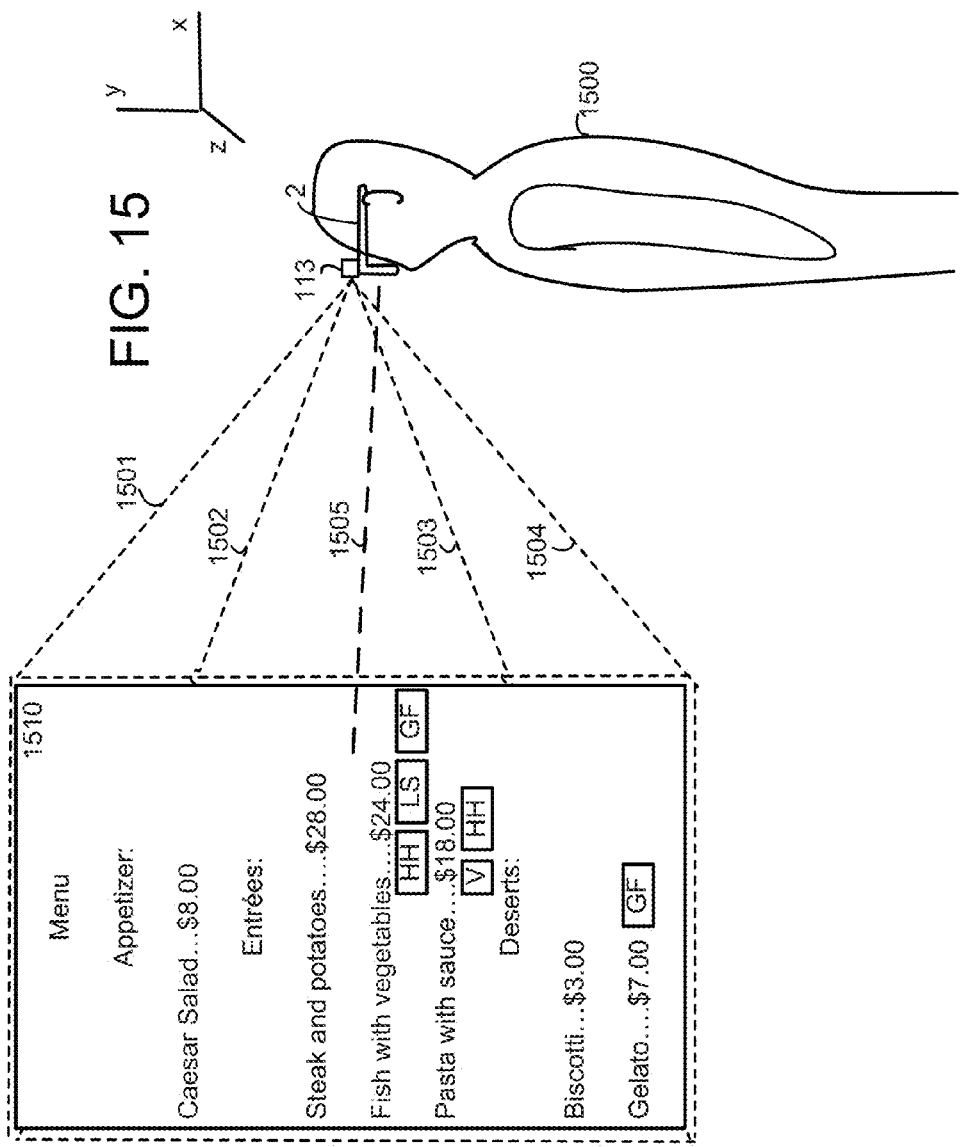

FIG. 16A

Nutritional parameters of menu selections

| Rest.id: | Restaurant Location: | Selection Id: | Selection Name: | Logo id: | Ingredients: |
|---|---|---|---|---|---|
| RID1 | RL1 | Appetizer1 | Caesar Salad | n/a | Lettuce, egg, garlic, oil, croutons, dressing |
| | | Entree1 | Steak/potatoes | n/a | steak, potatoes, gravy |
| | | Entree2 | Fish/vegetables | HH, LS, GF | Salmon, carrots, green beans, lemon juice |
| | | Entree3 | Pasta/sauce | V, HH | Wheat flour, tomatoes, oil, salt |
| | | Dessert1 | Biscotti | n/a | flour, butter, sugar, almonds, anise seeds, salt |
| | | Dessert2 | Gelato | GF | milk, cream, egg yolk, sugar, salt |

FIG. 16B

Nutritional parameters of menu selections

| Selection Id: | Compatible with: | Incompatible with: |
|---|---|---|
| Appetizer1 | n/a | Vegan, gluten-free |
| Entree1 | n/a | Vegan, heart healthy, low salt |
| Entree2 | Heart healthy, low salt, gluten-free | n/a |
| Entree3 | Vegan, heart healthy | Low salt |
| Dessert1 | n/a | gluten-free, nut allergy |
| Dessert2 | gluten-free, nut allergy | lactose-intolerant |

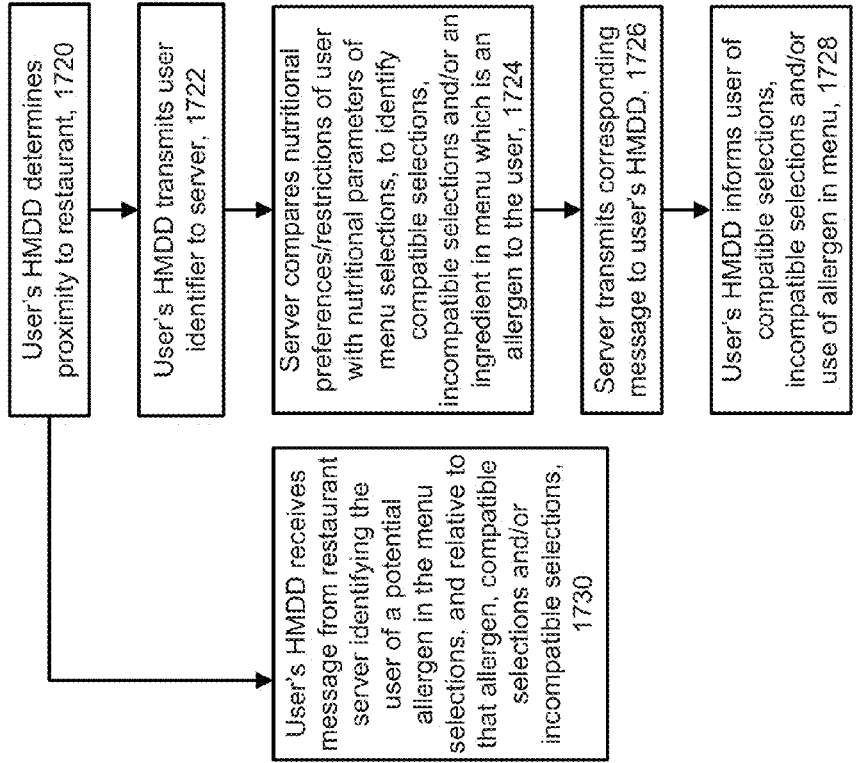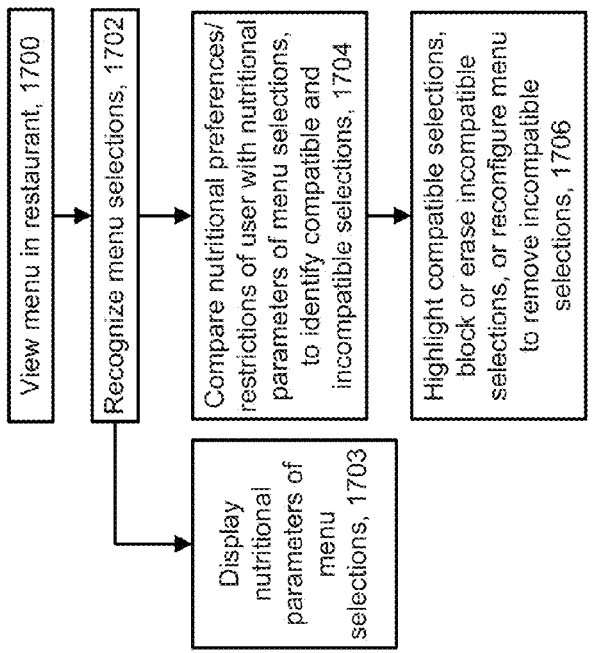

FIG. 18A

Menu 1800
Appetizer: 1802
Caesar Salad...$8.00
Entrées:
Steak and potatoes...$28.00 1804
Fish with vegetables...$24.00
Pasta with sauce...$18.00 1806
1808 Deserts:
Biscotti 1810
Warning: Contains nuts
Gelato...$7.00

FIG. 18B

Menu 1820
Appetizer:
Caesar Salad...$8.00
Entrées:
Steak and potatoes...$28.00
Fish with vegetables...$24.00
Pasta with sauce...$18.00
Deserts: 1822
Gelato...$7.00

FIG. 18C

Menu 1840
Appetizer:
Caesar Salad...$8.00
Entrées:
Fish with vegetables...$24.00
Pasta with sauce...$18.00
Deserts:
Gelato...$7.00

FIG. 18D

Menu 1860

Appetizer:

Caesar Salad...$8.00

Entrées:

Steak and potatoes....$28.00 — 1,200 calories ~1862

Fish with vegetables....$24.00 — 600 calories ~1864

Pasta with sauce....$18.00 — 450 calories ~1866

Deserts:

Biscotti...$3.00

Gelato....$7.00

PERSONAL AUDIO/VISUAL SYSTEM PROVIDING ALLERGY AWARENESS

CROSS-REFERENCE TO RELATED APPLICATIONS

This is a continuation-in-part application of U.S. patent application Ser. No. 13/250,878, titled "Personal Audio/Visual System," to K. Stone-Perez et al., filed Sep. 30, 2011, published as US 2013/0083003 on Apr. 4, 2013, and incorporated herein by reference.

BACKGROUND

Augmented reality is a technology that allows virtual imagery to be mixed with a real world physical environment. For example, an augmented reality system can be used to insert an image of a dinosaur into a user's view of a room so that the user sees a dinosaur walking in the room. In many cases, augmented reality is accomplished using an apparatus that can be viewed by one person or a small number of people. Therefore, the augmented reality system can provide a personalized experience. There is an opportunity to use augmented reality in various entertainment and task situations.

SUMMARY

Technology described herein provides various embodiments for implementing an augmented reality system that can assist a user in managing a food supply in one's home, and selecting foods such as when shopping in a store or while dining in a restaurant. In one approach, a forward-facing camera of a personal audio/video (A/V) apparatus captures an image of a food item. The personal audio/video (A/V) apparatus can be a head-mounted display device (HMDD) worn by the user, for instance. The image is processed to identify the food item. In some cases, a logo of the food item is identified, indicating that the food item has certain characteristics, e.g., low salt, heart healthy, vegan and so forth. Once the food item is identified, associated nutritional parameters such as ingredients can be identified and compared to a personal food profile of a user. The food profile indicates whether the user should avoid certain ingredients such as allergens. Based on the comparison, information can be displayed to the user as an augmented reality image, such as to identify recommended and non-recommended food items. In a restaurant, menu selections are identified to learn their associated nutritional parameters, and information is displayed to the user as an augmented reality image which highlights recommended and non-recommended menu selections.

In one approach, a method for recommending food to a user includes receiving image data of a scene from at least one forward-facing camera of a head-mounted display device worn by the user. For example, the scene can include a food item in a storage area of the home or in a grocery store. Based on the image data, a data source is accessed using an identifier of the food item and an identifier associated with the user. The data source can be, e.g., at the HMDD of the user, at another computing device of the user, at a server in a store, or at a cloud server which serves multiple stores. Based on the accessing of the data source, a determination is made as to whether or not the food item is recommended for the user. For example, the food item may be recommended if the food item is compatible with nutritional goals of the user, e.g., in terms of pursuing a low salt, heart healthy, or vegan diet, or in avoiding an allergen. An augmented reality projection system of the HMDD is controlled to project an augmented reality image to the user, based on the determination. The augmented reality image can highlight a recommended food item in storage location of several food items, or highlight a non-recommended food item, e.g., as a warning to avoid an allergen.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is an example configuration of one embodiment of the HMDD 2 of FIG. 1.

FIG. 2B is an example configuration of one embodiment of the hub computing system 12 and image capture devices 20A and 20B of FIG. 1.

FIG. 3B is a block diagram of one embodiment of hardware and software components of an auxiliary processing unit 4 of the HMDD 2 of FIG. 2A.

FIG. 5A is a block diagram of one embodiment of a system used to provide a customized experience.

FIG. 5B is a block diagram of another embodiment of a system used to provide a customized experience.

FIG. 5C is a block diagram of another embodiment of a system used to provide a customized experience.

FIG. 6B provides an example food profile in accordance with step 600 and 608 of FIG. 6A.

FIG. 6C provides an example of a personal A/V apparatus in the form of an HMDD capturing image data.

FIG. 6D depicts example database records of image data of food items which can be used to analyze camera-captured images.

FIG. 6E depicts an example shopping list.

FIG. 6F depicts an example food inventory.

FIGS. 8A-E and 9A1 are flow charts describing embodiments for implementing dietary restrictions.

FIG. 8A is a flowchart of a method for updating a food profile of a user.

FIG. 8B is a flowchart of a method for checking the food profile referred to in FIG. 8A to see if there is a food restriction associated with a missing food item of a storage location, in connection with step 616 of FIG. 6A.

FIG. 8C is a flowchart of a method for checking the food profile referred to in FIG. 8A to see if there is a food restriction associated with a food item being viewed, in connection with step 732 of FIG. 7C.

FIG. 8D is a flowchart of a method for checking ingredients of recipes identified at step 738 of FIG. 7C against the food profile referred to in FIG. 8A to see if there is a food restriction associated with any of the ingredients.

FIG. 8E is a flowchart of a method for checking the food profile referred to in FIG. 8A to see if there is a food restriction associated with a menu identified in step 776 of FIG. 7D.

FIG. 8F provides an example of a food profile in accordance with steps 802 and 804 of FIG. 8A, showing preferences/restrictions of different users, special identification of allergens and their severity and association of the preferences/restrictions of selected users.

FIG. 8G depicts an example of nutritional parameters of food items, for use in determining whether there is a restriction or incompatibility associated with a food item, such as for use in connection with step 810 of FIG. 8B, step 820 of FIG. 8C, and step 830 of FIGS. 8D and 8E.

FIG. 8H depicts an example recipe obtained by the processes of FIGS. 8C, 8D and 8E which accounts for a restriction or incompatibility associated with a food item.

FIG. 9A1 is a flowchart describing one embodiment of a process that includes accounting for food restrictions when the user is looking at food items through the personal A/V apparatus.

FIG. 9A2 is a flowchart describing one embodiment of a process at a server for recommending food to a user.

FIG. 10B depicts an example scenario in which an HMDD-wearing user 1000 looks at an individual food item 1033 in a store or other location.

FIG. 10C depicts an example layout of a store 1040, and antennas 1060-1062 used to determine a position 1070 of the HMDD-wearing user 1000 of FIG. 10A.

FIG. 11A depicts example records of inventory data of different stores including the store 1040 of FIG. 10C.

FIG. 11B depicts product nutritional parameters for products of the inventory of FIG. 11A.

FIG. 11C depicts example records of image data for products of the inventory of FIG. 11A.

FIG. 11D depicts example records of logo images for products of the inventory of FIG. 11A.

FIGS. 11E and 11F depict example logo images for the vegan logo images files V.file1 and V.file2, respectively, of FIG. 11D.

FIG. 12A depicts an example process for recognizing food items in a view, in accordance with step 706 in FIG. 7B, step 732 of FIGS. 7C and 8C, and step 852 in FIG. 9A1.

FIG. 12B depicts further details of steps 1214 or 1222 of FIG. 12A.

FIG. 12D depicts further details of step 1246 in FIG. 12C.

FIG. 12E depicts further details of step 1248 in FIG. 12C.

FIG. 13 depicts a process for tracking a user's gaze direction and depth of focus such as for use in step 606 of FIG. 6A and step 1206 of FIG. 12A.

FIG. 14A depicts the scene portion 1002 of FIG. 10A.

FIG. 14B depicts a composite image 1400 which includes the scene portion 1002 of FIG. 14A with the addition of augmented reality images 1402 or 1404.

FIG. 14C depicts a composite image 1410 which includes the scene portion 1002 of FIG. 14A with the addition of augmented reality images 1411-1413.

FIG. 14D depicts a composite image 1420 which includes the scene portion 1002 of FIG. 14A with the addition of augmented reality image 1421.

FIG. 14E depicts a cropped image 1430 corresponding to the area 1402 of FIG. 14B.

FIG. 14F depicts a scene in which a user holds an individual food product.

FIG. 14G depicts a composite image 1450 which includes the scene 1440 of FIG. 14F with the addition of augmented reality images 1451-1453.

FIG. 14H depicts a scene of a user holding an individual food product 1460, and an augmented reality image 1464 which provides nutritional parameters of the food item.

FIGS. 15-18 involve a scenario in which a user views a menu at a restaurant.

FIG. 15 depicts an example scenario in which an HMDD-wearing user 1500 looks at a menu 1510 in a restaurant.

FIG. 16A depicts records of nutritional parameters of menu selections of the menu of FIG. 15A.

FIG. 16B depicts records of additional nutritional parameters of menu selections of the menu of FIG. 15A.

FIG. 17A depicts a flowchart of a method in which a user views a menu in a restaurant.

FIG. 17B depicts a flowchart of another method in which a user receives nutritional information in a restaurant.

FIG. 18A depicts a composite image 1800 which is based on the menu 1510 with the addition of augmented reality images 1802, 1804 and 1806 which highlight recommended menu selections, and augmented reality images 1808 and 1810 which block and provide information, respectively, regarding a non-recommended menu selection.

FIG. 18B depicts a composite image 1810 which is based on the menu 1510 with the addition of an augmented reality image 1822 which blocks or erases a non-recommended menu selection.

FIG. 18C depicts a reconfigured menu which includes only recommended menu selections.

DETAILED DESCRIPTION

The technology described herein includes a see-through, near-eye, mixed reality display device for assisting a user in managing and selection food.

In one approach, a personal A/V apparatus can be used to provide a user with an awareness of food restrictions (e.g., food allergies, diets, etc.) For example, when looking at a food item that the user (or family/friend) is allergic to, the personal A/V apparatus can warn the user of the allergy or prevent the user from seeing the item so that the user does not purchase or eat it. When choosing menus or dishes at a restaurant, the personal A/V device can also make sure that the user is only offered food items that map into the user's dietary requirements.

One embodiment includes a customized method for determining and reacting to allergies and dietary restrictions. The method includes recognizing one or more items in view of a personal A/V apparatus; checking a food profile to see if there is a food restriction associated with the items in view; if there are no other restrictions, allowing access to the item; and if there are restrictions, skipping the item from being used in a current activity (such as being viewed, used in a recipe, eaten, etc.).

In one embodiment, the user's food profile will include information about food restrictions for the user, user's family and/or user's friends. Food restrictions could include foods that user is allergic to. Food restrictions can also include foods that the user doesn't want to eat because the user is on a diet. Other reasons can be used to make a food restricted. A user is able to swap this warning on and off.

Figure 1:
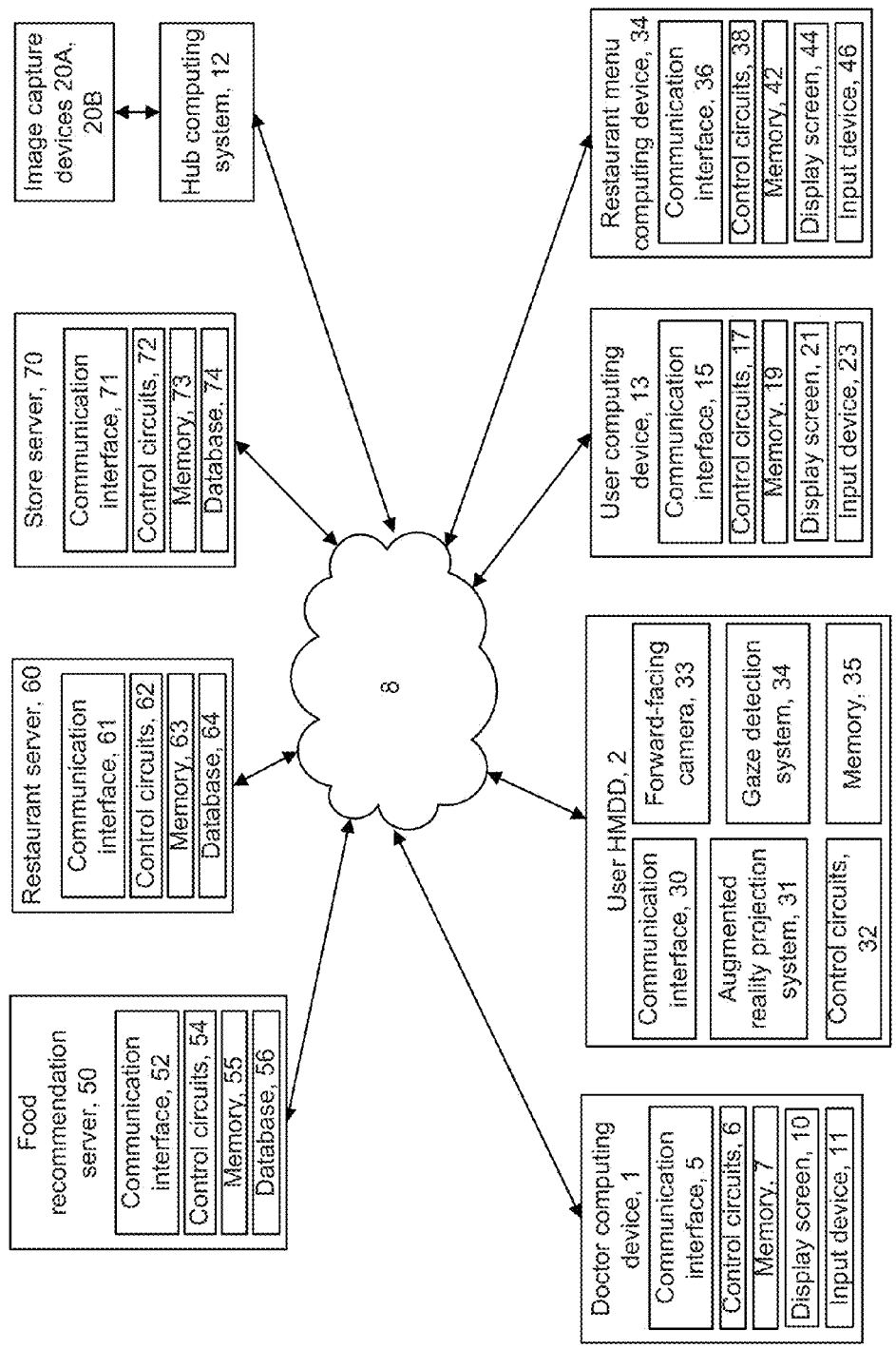
FIG. 1 depicts a system in which a user obtains a food recommendation.

FIG. 1 depicts a system in which a user obtains a food recommendation. The system includes one or more networks 8 by which a number of computing devices can communicate with one another. The network can include, e.g., WI-FI® (IEEE 802.11, a type of wireless local area network), BLUETOOTH® (IEEE 802.15.1, an open wireless protocol for exchanging data over short distances from fixed and mobile devices, creating personal area networks or piconets), infrared (e.g., IrDA® or INFRARED DATA ASSOCIATION® standard, a communications protocol for short range exchange of data over infrared light such as for use in personal area networks), cellular (e.g., Global System for Mobile communication (GSM) signals which are emitted from cell phone antennas), or other wireless communication means.

The system allows communication among one or more computing devices of a user (such as HMDD 2 and computing device 13) and one or more other computing devices which assist the user in making food selections.

For example, a food recommendation server 50 can store data regarding food preferences, including restrictions, of the user, and nutritional parameters of different foods. The nutritional parameters can include ingredients of a food or menu selection, and/or information about whether a food meets certain food certifications or standards, e.g., for foods that are low salt, vegan, heart healthy and so forth. The food recommendation server 50 includes a communication interface 52, control circuits 54, a memory 55 and a database 56 which can store records described further below.

A restaurant server 60 can store data regarding different foods such as menu selections. The restaurant server 60 includes a communication interface 61, control circuits 62, a memory 63 and a database 64 which can store records described further below. This server is concerned with menu selections served at a restaurant and can be located at a restaurant or at a location which serves multiple restaurants.

A store server 70 can store data regarding nutritional parameters of different foods which are sold at a store. This can include a large inventory of food products which have unique identifiers such as Universal Product Codes (UPCs). The store 70 includes a communication interface 71, control circuits 72, a memory 73 and a database 74 which can store records described further below. This server is typically concerned with products sold at a store and can be located at a store or at a location which serves multiple stores. In a scenario where a user is at a store, the user's HMDD can communicate with one or both of the servers 50 and 70 to obtain food recommendations. In a scenario where a user is at a restaurant, the user's HMDD can communicate with one or both of the servers 50 and 60 to obtain food recommendations. Typically, the user's food preferences/restrictions can be stored at a central server such as the food server 50 although it is possible to store this user data at a restaurant or store server as well or alternatively. In another option, the preferences/restrictions can be stored at the user's HMDD or associated device.

The hub computing system 12 and image capture devices 20A and 20B can provide content and processing capabilities for the HMDD 2, as well as provide other features such as discussed in connection with FIGS. 2B, 4A and 4B.

One or more client computing devices can also be used. A doctor computing device 1 can be used by a health care provider of the user to update the data regarding food preferences/restrictions of the user at the food recommendation server 24. The doctor computing device includes a communication interface 5, control circuits 6, a memory 7, a display screen 10 and an input device 11 such as a keyboard or mouse. The input device could be part of the display screen when a touch screen is used, for instance.

The HMDD 2 can be used by the user who receives food recommendations. The HMDD is a type of computing device, and can include components such as a communication interface 30, an augmented reality projection system 31, control circuits 32, one or more forward-facing cameras 33 (or cameras which otherwise capture a room or other physical environment of the user), a gaze detection system 34 (detecting a gaze direction of the user) and one or more memory components 35. See also FIGS. 2A, 3A and 3B which provide further details.

A user computing device 13 can also be used by the user who receives food recommendations, and includes a communication interface 15, control circuits 17, a memory 19, a display screen 21 and an input device 23. For example, the computing device may be used to set up profiles, and preferences/restrictions.

A restaurant menu computing device 34 can be used at a restaurant by the user who receives food recommendations. The restaurant menu computing device may be, e.g., a menu display board which is viewed by patrons of the restaurant, or a portable device such as a tablet which is used at a table of diners or by an individual diner. See FIG. 15 for further details. The restaurant menu computing device 34 includes a communication interface 36, control circuits 38, a memory 42, a display screen 44 and an input device 46. A menu which has embedded components such as RFID tags associated with different menu selections could also be used. Such a menu can be conventional in other regards such as by using printed text on paper or plastic. In another approach, a menu is used which has visible logos or tags (such as a logo for heart healthy or vegan food, or a tag which provides a quick response code which can be read to access data). The RFID tag, logos or other tags can be used to identify menu selections and their nutritional parameters.

Generally, the communication interfaces allow communication between computing devices. The control circuits provide control of hardware and/or software of the respective computing devices. For example, the control circuits can include one or more processors which execute instructions stored on one or more tangible, non-transitory processor-readable storage devices for performing processor- or computer-implemented methods as described herein. The memories can store the instructions as code, and can provide the processor-readable storage devices. The display screen display information to the users of the respective computing devices and the input devices receive control inputs from the users. The databases and/or memories can provide data stores or sources which contain data which is accessed to perform the techniques described herein.

The HMDD allows the user to view the physical environment with augmented reality images superimposed over it. The HMDD also allows communication of data, including video or other image data, with the other computing devices and servers.

FIG. 2A is a block diagram depicting example components of one embodiment of a see-through, mixed reality display device in a system environment in which the device may operate. In this example, the HMDD 2 includes a head-mounted portion 3 and an auxiliary processing unit 4. In other embodiments, the capabilities of the auxiliary processing unit may be integrated in software and hardware components of the head-mounted portion 3.

Here, the HMDD 2 is in communication with processing unit 4 via wire 6. In other embodiments, head-mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly to one or more of the servers, computing devices, hub computing systems 12, hot spots, cellular data networks, etc. The processing unit 4 could be a mobile computing device, for instance, which is held or worn by the user, or situated near the user.

The HMDD 2, which in one embodiment, is in the shape of eyeglasses in a frame 115, is worn on the head of a user so that the user can see through a display, embodied in this example as a display optical system 14 for each eye, and thereby have a direct view of the physical environment in front of the user. Augmented reality images, also referred to as virtual images, can be generated by a projection system of the HMDD and appear to be present in, or superimposed over, the physical environment.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor, hat, helmet or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds such as spoken commands of the user, or sounds in the physical environment of the user, and transmitting audio data to processing unit 4.

FIG. 2B is an example configuration of one embodiment of the hub computing system 12 and image capture devices 20A and 20B of FIG. 1. In one possible approach, the HMDD 2 communicates with the food recommendation server via the hub computing system 12. In another possible approach, the hub computing system 12 is not used and the HMDD 2 communicates with the food recommendation server directly via the network 8.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. An application executes on hub computing system 12, the HMDD 2, or a combination of these.

One or more depth cameras, such as image capture devices 20A and 20B, can be used to capture the room or other physical environment of the user. The image capture devices can visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character.

Hub computing system 12 may be connected to speakers 22 and an audiovisual device 16 such as a television, a monitor, a high-definition television (HDTV), or the like that may provide game or application visuals.

Figure 3A:
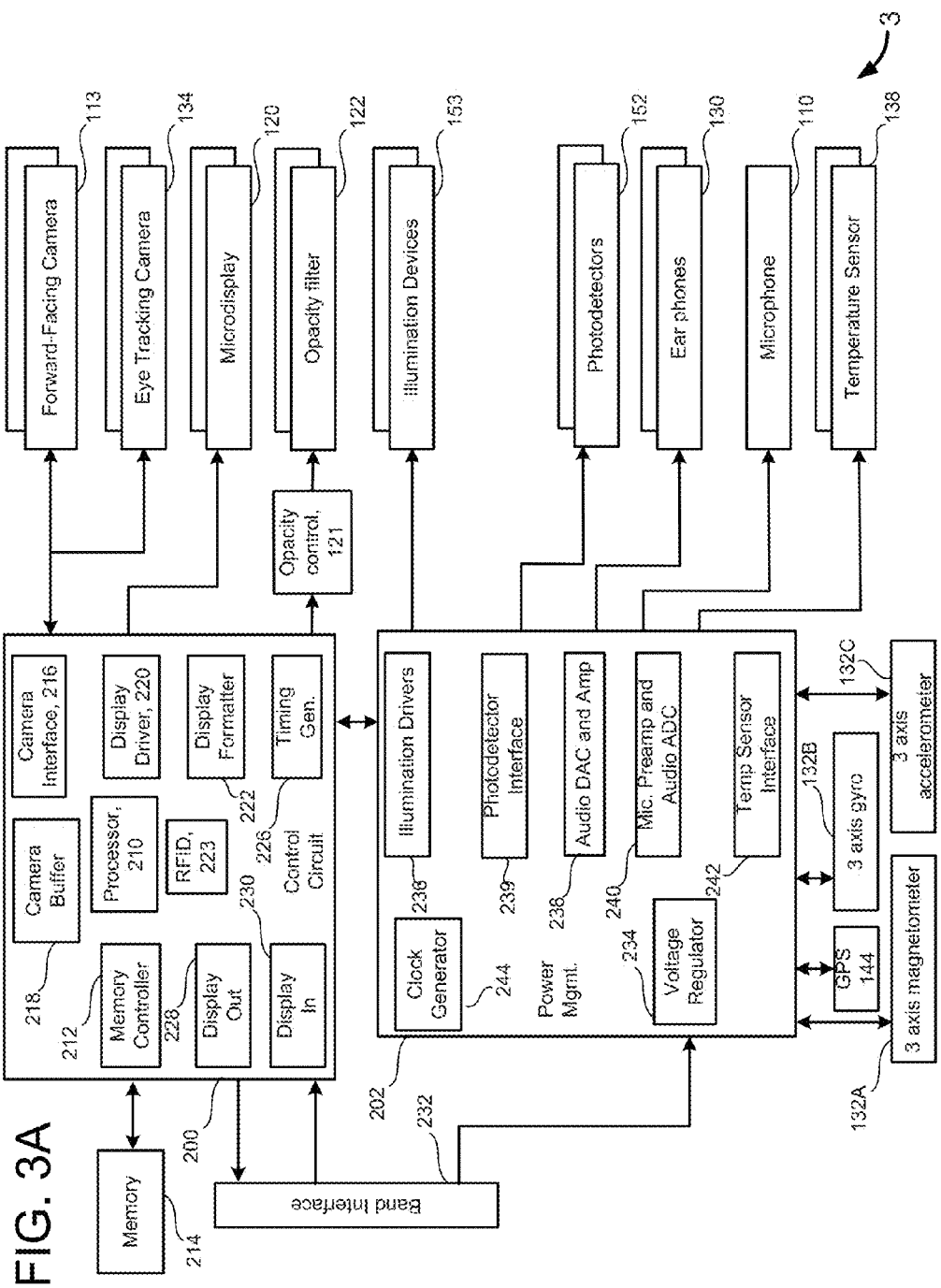
FIG. 3A is a block diagram of one embodiment of hardware and software components of the head-mounted portion 3 of the HMDD 2 of FIG. 2A.

FIG. 3A is a block diagram of one embodiment of hardware and software components of the head-mounted portion 3 of the HMDD 2 of FIG. 2A. In this embodiment, the head-mounted portion 3 of the HMDD 2 receives instructions about a virtual image from processing unit 4 and provides the sensor information back to processing unit 4. Software and hardware components which may be embodied in a processing unit 4, depicted in FIG. 3B, receive the sensory information from the head-mounted portion 3 of the HMDD 2 and may also receive sensory information from hub computing device 12 (see FIGS. 2B, 4A and 4B). Based on that information, processing unit 4 will determine where and when to provide a virtual image to the user and send instructions accordingly to the control circuitry 136 of the HMDD 2.

Note that some of the components of FIG. 3A (e.g., a forward-facing camera 113 (or a camera which otherwise faces a physical environment), eye tracking camera 134, photodetector interface 139, microdisplay 120, opacity filter 122 with opacity control 121, illumination device 153 or illuminators, earphones 130, and temperature sensor 138 are shown in shadow to indicate that there are at least two of each of those devices, at least one for the left side and at least one for the right side of HMDD 2.

Regarding the forward-facing camera 113, in one approach, one camera is used to obtain images using visible light. In another approach, two or more cameras with a known spacing between them are used as a depth camera to also obtain depth data for objects in a room, indicating the distance from the cameras/HMDD to the object. The forward cameras of the HMDD can essentially duplicate the functionality of the depth camera provided by the computer hub 12, as described, e.g., in connection with FIG. 4B.

Images from forward facing cameras can be used to identify a physical environment of the user, including a scene which is viewed by the user, e.g., including food items, people and other objects in a field of view of the user, as well as gestures such as a hand gesture of the user.

The control circuit 200, in communication with the power management circuit 202, includes processor 210, memory controller 212 in communication with memory 214 (e.g., DRAM), camera interface 216, camera buffer 218, display driver 220, display formatter 222, timing generator 226, display out 228, and display in interface 230. In one embodiment, all of components of display driver 220 are in communication with each other via dedicated lines of one or more buses. In another embodiment, each of the components of control circuit 200 is in communication with processor 210. An RFID 223 system can be used to communicate with RFID tags such as in food items and on menus.

Display formatter 222 provides information, about the image being displayed on microdisplay 120, to opacity control circuit 121, which controls opacity filter 122. Opacity filter 122 selectively blocks natural light, either uniformly or on a per-pixel basis, from passing through a light guide optical element 112. In one embodiment, the opacity filter can be a see-through LCD panel, electrochromic film, or similar device. The LCD panel can include one or more light-transmissive LCD chips which allow light to pass through the liquid crystal. Opacity filter 114 can include a dense grid of pixels, where the light transmissivity of each pixel is individually controllable between minimum and maximum transmissivities. A transmissivity can be set for each pixel by the opacity filter control circuit 121.

Camera interface 216 provides an interface to the two physical environment facing cameras 113 and each eye tracking camera 134 and stores respective images received from the cameras 113, 134 in camera buffer 218. Display driver 220 drives microdisplay 120. Display formatter 222 may provide information, about the virtual image being displayed on microdisplay 120 to one or more processors of one or more computer systems, e.g., 4, 12, 210 performing processing for the augmented reality system. Timing generator 226 is used to provide timing data for the system. Display out 228 is a buffer for providing images from physical environment facing cameras 113 and the eye tracking cameras 134 to the processing unit 4. Display in 230 is a buffer for receiving images such as a virtual image to be displayed on microdisplay 120. Display out 228 (an interface) and display in 230 communicate with band interface 232, which is an interface to processing unit 4.

Power management circuit 202 includes voltage regulator 234, eye tracking illumination driver 236, photodetector interface 239, audio DAC and amplifier 238, microphone preamplifier and audio ADC 240, temperature sensor interface 242, and clock generator 244. Voltage regulator 234 receives power from processing unit 4 via band interface 232 and provides that power to the other components of head-mounted display device 2. Illumination driver 236 controls, for example via a drive current or voltage, the illumination devices 153 to operate about a predetermined wavelength or within a wavelength range. Audio DAC and amplifier 238 receive the audio information from earphones 130. Microphone preamplifier and audio ADC 240 provide an interface for microphone 110. Temperature sensor interface 242 is an interface for temperature sensor 138. Power management circuit 202 also provides power and receives data back from three axis magnetometer 132A, three axis gyro 132B and three axis accelerometer 132C. Power management circuit 202 also provides power and receives data back from and sends data to GPS transceiver 144.

The photodetector interface 239 performs any analog to digital conversion needed for voltage or current readings from each photodetector, stores the readings in a processor readable format in memory via the memory controller 212, and monitors the operation parameters of the photodetectors 152 such as temperature and wavelength accuracy.

For the HMDD 2 of FIG. 1, the communication interface 30 can comprise band interface 232, the augmented reality projection system 31 can comprise microdisplay 120, display driver 220, display formatter 222, opacity filter 122, opacity control 121, and illumination devices 153, the control circuits 32 can comprise processor 210 and memory controller 212, the one or more forward-facing cameras 33 can comprise forward-facing camera 113, camera interface 21 and camera buffer 218, the gaze detection system 34 can comprise eye tracking camera 134, and the one or more memory components 35 can comprise memory 214.

FIG. 3B is a block diagram of one embodiment of the hardware and software components of a processing unit 4 associated with a see-through, near-eye, mixed reality display unit. Control circuit 304 is in communication with power management circuit 306, and includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with the head-mounted portion 3 of the HMDD 2 via band interface 302 and band interface 232, display in buffer 338 in communication with the head-mounted portion 3 of the HMDD 2 via band interface 302 and band interface 232, microphone interface 340 in communication with an external microphone connector 342 for connecting to a microphone, PCI express interface 344 for connecting to a wireless communication device 346, and USB port(s) 348.

In one embodiment, wireless communication device 346 can include a WI-FI® enabled communication device, BLUETOOTH® communication device, infrared communication device, etc. The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power source 376 provides power to the display device 2.

For the HMDD 2 of FIG. 1, the communication interface 30 can comprise band interface 302 and wireless communication device 346, the control circuits 32 can comprise flash controller 332, memory controller 328, CPU 320 and GPU 322 and the one or more memory components 35 can comprise flash memory 334, memory 330 and cache 324, RAM 326.

Figure 4A:
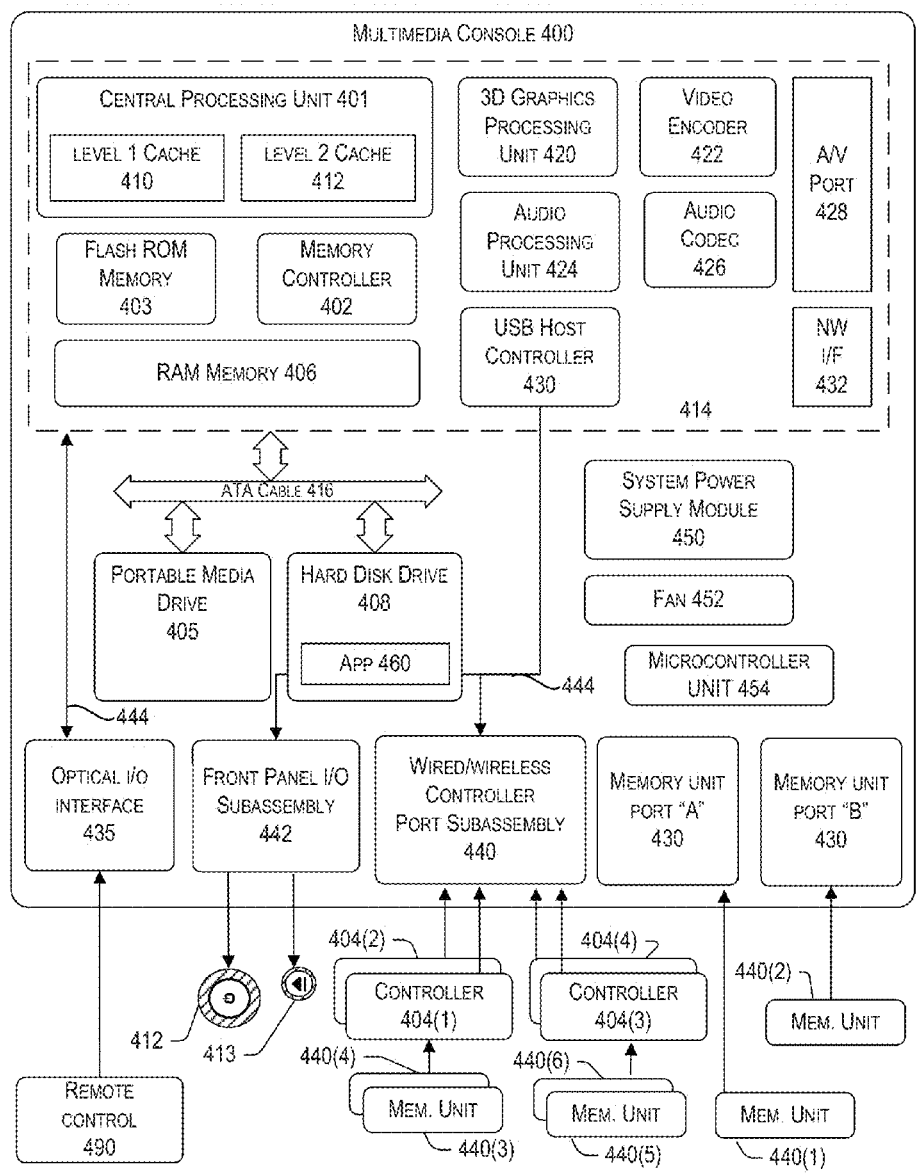
FIG. 4A is a block diagram of one embodiment of a computing system that can be used to implement the hub computing system 12 of FIG. 1.

FIG. 4A is a block diagram of one embodiment of a computing system that can be used to implement the hub computing system 12 of FIG. 1. In this embodiment, the computing system is a multimedia console 400, such as a gaming console. The multimedia console 400 has a CPU 401, and a memory controller 402 that facilitates processor access to various types of memory, including a flash Read Only Memory (ROM) 403, a Random Access Memory (RAM) 406, a hard disk drive 408, and portable media drive 405. In one implementation, CPU 401 includes a level 1 cache 410 and a level 2 cache 412, to temporarily store data and hence reduce the number of memory access cycles made to the hard drive 408, thereby improving processing speed and throughput.

CPU 401, memory controller 402, and various memory devices are interconnected via one or more buses (not shown).

In one implementation, CPU 401, memory controller 402, ROM 403, and RAM 406 are integrated onto a common module 414. In this implementation, ROM 403 is configured as a flash ROM that is connected to memory controller 402 via a PCI bus and a ROM bus (neither of which are shown). RAM 406 is configured as multiple Double Data Rate Synchronous Dynamic RAM (DDR SDRAM) modules that are independently controlled by memory controller 402 via separate buses (not shown). Hard disk drive 408 and portable media drive 405 are shown connected to the memory controller 402 via the PCI bus and an AT Attachment (ATA) bus 416.

A GPU 420 and a video encoder 422 form a video processing pipeline for high speed and high resolution graphics processing. Data are carried from GPU 420 to video encoder 422 via a digital video bus (not shown). Lightweight messages generated by the system applications (e.g., pop ups) are displayed by using a GPU 420 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 424 and an audio codec (coder/decoder) 426 form a corresponding audio processing pipeline for multi-channel audio processing of various digital audio formats. Audio data are carried between audio processing unit 424 and audio codec 426 via a communication link (not shown). The video and audio processing pipelines output data to an A/V (audio/video) port 428 for transmission to a television or other display. In the illustrated implementation, video and audio processing components 420-428 are mounted on module 414.

A module 414 includes a USB host controller 430 and a network interface 432. USB host controller 430 is shown in communication with CPU 401 and memory controller 402 via a bus (e.g., PCI bus) and serves as host for peripheral controllers 404(1)-404(4). Network interface 432 provides access to a network (e.g., Internet, home network, etc.) and may be any of a wide variety of various wired or wireless interface components.

In the implementation depicted, console 400 includes a controller support subassembly 440 for supporting four controllers 404(1)-404(4). The controller support subassembly 440 includes any hardware and software components needed to support wired and wireless operation with an external control device, such as for example, a media and game controller. A front panel I/O subassembly 442 supports the multiple functionalities of power button 412, the eject button 413, as well as any LEDs (light emitting diodes) or other indicators exposed on the outer surface of console 402. Subassemblies 440 and 442 are in communication with module 414 via one or more cable assemblies 444. In other implementations, console 400 can include additional controller subassemblies. An optical I/O interface 435 sends and receives signals that can be communicated to module 414.

Memory units (MUs) 440(1) and 440(2) are connectable to MU ports "A" 430(1) and "B" 430(2) respectively. Additional MUs (e.g., MUs 440(3)-440(6)) are illustrated as being connectable to controllers 404(1) and 404(3), i.e., two MUs for each controller. Controllers 404(2) and 404(4) can also be configured to receive MUs (not shown). Each MU 440 offers additional storage on which games, game parameters, and other data may be stored. In some implementations, the other data can include any of a digital game component, an executable gaming application, an instruction set for expanding a gaming application, and a media file. When inserted into console 400 or a controller, MU 440 can be accessed by memory controller 402. A system power supply module 450 provides power to the components of gaming system 400. A fan 452 cools the circuitry within console 400. A microcontroller unit 454 is also provided.

An application 460 comprising machine instructions is stored on hard disk drive 408. When console 400 is powered on, various portions of application 460 are loaded into RAM 406, and/or caches 410 and 412, for execution on CPU 401, wherein application 460 is one such example. Various applications can be stored on hard disk drive 408 for execution on CPU 401.

Gaming and media system console 400 may be operated as a standalone system by simply connecting the system to monitor 16 (FIG. 2B), a television, a video projector, or other display device. In this standalone mode, gaming and media system console 400 enables one or more players to play games, or enjoy digital media, e.g., by watching movies, or listening to music. However, with the integration of broadband connectivity made available through network interface 432, gaming and media system 400 may further be operated as a participant in a larger network gaming community.

The system described above can be used to add virtual images to a user's view such that the virtual images are mixed with real images that the user see. In one example, the virtual images are added in a manner such that they appear to be part of the original scene. Examples of adding the virtual images can be found U.S. patent application Ser. No. 13/112,919, "Event Augmentation With Real-Time Information," filed on May 20, 2011; and U.S. patent application Ser. No. 12/905,952, "Fusing Virtual Content Into Real Content," filed on Oct. 15, 2010; both applications are incorporated herein by reference in their entirety.

Figure 4B:
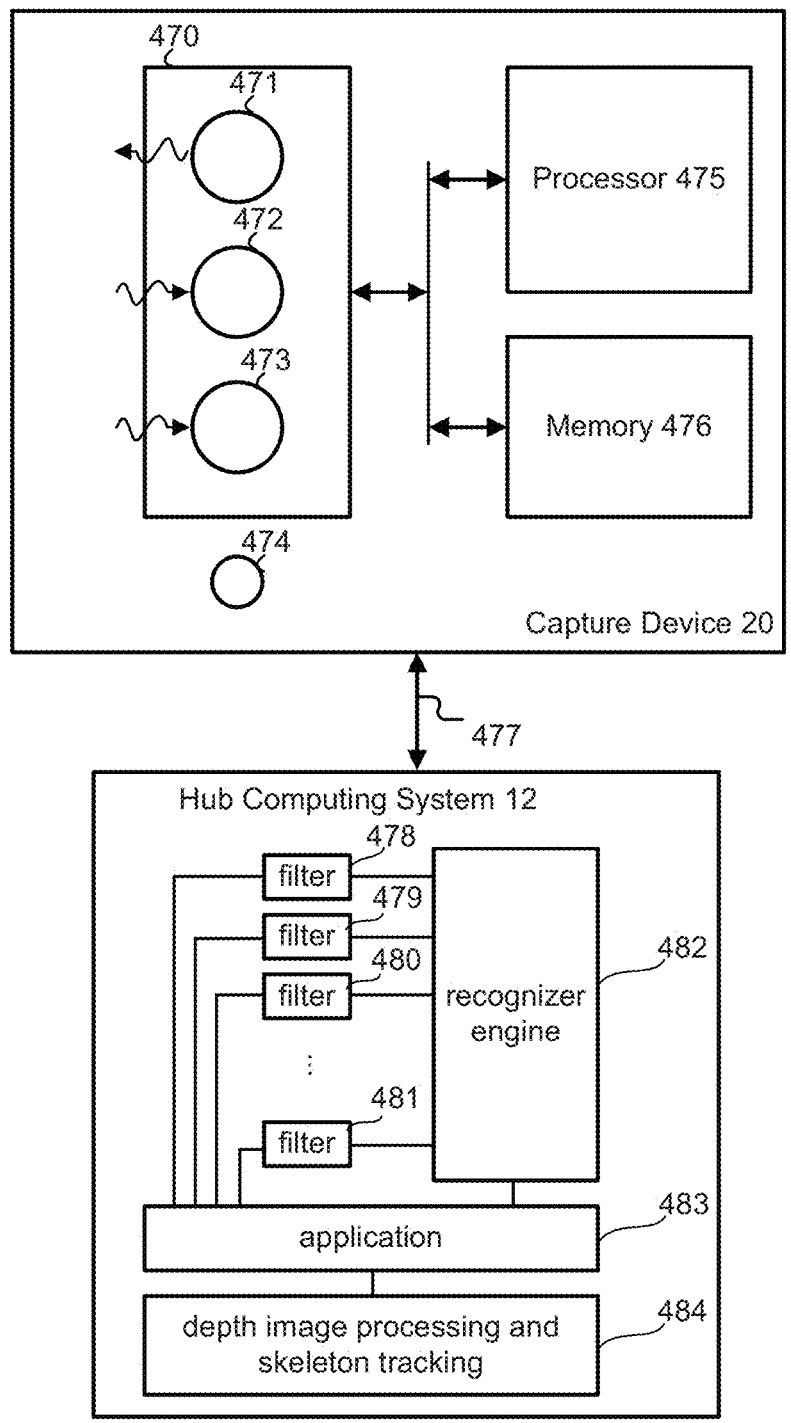
FIG. 4B is a block diagram of one embodiment of the components of the hub computing system 12 and the image capture devices 20A and 20B of FIG. 1.

FIG. 4B is a block diagram of one embodiment of the components of the hub computing system 12 and the image capture devices 20A and 20B of FIG. 1. However, the description can also apply to the HMDD 2, where the depth cameras (a capture device) use the forward-facing camera 113 to obtain and process images to detect a gesture such as a hand gesture, for instance, or a distance from the HMDD to an object in a scene. Capture device 20 (representing 20A and/or 20B) may be configured to capture video with depth information including a depth image that may include depth values via any suitable technique including, for example, time-of-flight, structured light, stereo image, or the like. The capture device 20 may organize the depth information into "Z layers," or layers that may be perpendicular to a Z axis extending from the depth camera along its line of sight.

A camera component 470 may be or may include a depth camera that may capture a depth image of a scene. The depth image may include a two-dimensional (2-D) pixel area of the captured scene where each pixel in the 2-D pixel area may represent a depth value as a distance of an object in the captured scene from the camera.

Camera component 470 may include an infrared (IR) light emitting component 471 (which emits IR radiation as indicated by the arrow moving away from the component), an IR camera 472 (which senses IR radiation as indicated by the arrow moving toward the component), and an RGB (visual image) camera 473 (which senses visible radiation as indicated by the arrow moving toward the component) that may be used to capture the depth image of a scene. A 3-D camera is formed by the combination of the IR light emitting component 471 and the IR camera 472. In a time-of-flight analysis, the IR light emitting component 471 emits IR light onto the scene. Sensors such as the IR camera 472 and/or the RGB camera 473 are then used to detect the backscattered light from the surface of one or more targets and objects in the scene. In some embodiments, pulsed IR light may be used such that the time between an outgoing light pulse and a corresponding incoming light pulse is measured and used to determine a physical distance from the capture device 20 to a particular location on the targets or objects in the scene. Additionally, the phase of the outgoing light wave may be compared to the phase of the incoming light wave to determine a phase shift. The phase shift may then be used to determine a physical distance from the capture device to a particular location on the targets or objects.

A time-of-flight analysis may be used to indirectly determine a physical distance from the capture device 20 to a particular location on the targets or objects by analyzing the intensity of the reflected beam of light over time via various techniques including, for example, shuttered light pulse imaging.

The capture device 20 may use a structured light to capture depth information. In such an analysis, patterned light (i.e., light displayed as a known pattern such as grid pattern, a stripe pattern, or different pattern) may be projected onto the scene via, for example, the IR light emitting component 471. Upon striking the surface of one or more targets or objects in the scene, the pattern may become deformed in response. Such a deformation of the pattern may be captured by, for example, the IR camera 472 and/or the RGB camera 473 (and/or other sensor) and may then be analyzed to determine a physical distance from the capture device to a particular location on the targets or objects. In some implementations, the IR light emitting component 471 is displaced from the cameras 472 and 473 so that triangulation can be used to determined distance from cameras 472 and 473. In some implementations, the capture device 20 will include a dedicated IR sensor to sense the IR light, or a sensor with an IR filter.

The capture device 20 may include two or more physically separated cameras that may view a scene from different angles to obtain visual stereo data that may be resolved to generate depth information. Other types of depth image sensors can also be used to create a depth image. The capture device 20 may further include a microphone 474.

A processor 475 may execute instructions for receiving a depth image, generating the appropriate data format (e.g., frame) and transmitting the data to hub computing system 12.

A memory 476 stores the instructions that are executed by processor 475, images or frames of images captured by the 3-D camera and/or RGB camera, or any other suitable information, images, or the like.

Capture device 20 is in communication with hub computing system 12 via a communication link 477 such as a wired or wireless connection. The capture device 20 provides the depth information and visual (e.g., RGB or other color) images captured by, for example, the 3-D camera 472 and/or the RGB camera 473 to hub computing system 12 via the communication link 477. Hub computing system 12 may then create and use a model, depth information, and captured images to, for example, control an application such as a game or word processor and/or animate an avatar or on-screen character.

Hub computing system 12 includes depth image processing and skeletal tracking module 484, which uses the depth images to track one or more persons detectable by the depth camera function of capture device 20. Module 484 provides the tracking information to application 483, which can be a video game, productivity application, communications application or other software application. The audio data and visual image data is also provided to application 483 and module 484. Application 483 provides the tracking information, audio data and visual image data to recognizer engine 482. In another embodiment, recognizer engine 482 receives the tracking information directly from module 484 and receives the audio data and visual image data directly from capture device 20.

Recognizer engine 482 is associated with a collection of filters 478, 479, 480, . . . , 481 each comprising information concerning a gesture, action or condition that may be performed by any person or object detectable by capture device 20. For example, the data from capture device 20 may be processed by filters 478, 479, 480, . . . , 481 to identify when a user has performed one or more gestures or other actions. Those gestures may be associated with various controls, commands, objects or conditions of application 483.

As mentioned, the functions of the capture device 2 and hub computing system 12 of FIG. 4B can be provided in the HMDD, additionally or alternatively.

One or more control circuits can be provided, e.g., by the components 4, 6, 17, 32, 38, 54, 62, 72, 401, 420, 424, 454 and 484. The one or more control circuits can include one or more processors which execute instructions stored on one or more tangible, non-transitory processor-readable storage devices for performing processor- or computer-implemented methods described herein. At least one control circuit can also include the one or more tangible, non-transitory processor-readable storage devices, or other non-volatile or volatile storage devices. The storage device, as a computer-readable media, can be provided, e.g., by components 7, 19, 35, 55, 63, 73, 214, 326, 330, 334, 403, 406, 410, 412, 440(1)-440(6) and 476.

Referring to FIGS. 5A-5C, technology can be provided for augmenting a user experience at various situations. In one embodiment, an information provider prepares supplemental information regarding actions and objects occurring within an event. A user wearing an at least partially see-through, head mounted display can register (passively or actively) their presence at an event or location and a desire to receive information about the event or location. FIG. 5A illustrates a block diagram of a system for implementing the augmenting of the user experience. For example, FIG. 5A shows a personal audio/visual ("A/V") apparatus 502 in communication with a Supplemental Information Provider 504 via one or more networks 506. In one possible approach, the Supplemental Information Provider 504 is the food recommendation server 50 of FIG. 1.

In one embodiment, the personal A/V apparatus 502 can be head mounted display device 2 (or other A/V apparatus) in communication with a local processing apparatus (e.g., processing unit 4 of FIG. 2A, a mobile device, or other suitable data processing device). One or more networks 506 can include wired and/or wireless networks, such as a LAN, WAN, WI-FI®, the Internet, an Intranet, cellular network etc. No specific type of network or communication means is required. In one embodiment, Supplemental Information Provider 504 is implemented in hub computing system 12 (See FIG. 1). However, Supplemental Information Provider 504 can also be implemented in other types of computing devices (e.g., desktop computers, laptop computers, servers, mobile computing devices, tablet computers, mobile telephones, etc.). Supplemental Information Provider 504 can be implemented as one computing device or multiple computing devices. In one embodiment, Supplemental Information Provider 504 is located locally to personal A/V apparatus 502 so that they communication over a local area network, WI-FI®, BLUETOOTH® or other short range communication means. In another embodiment, Supplemental Information Provider 504 is located remotely from personal A/V apparatus 502 so that they communication over the Internet, cellular network or other longer range communication means.

FIG. 5B shows an example architecture for one or more processes and/or software running on Supplemental Information Provider 504. Supplemental Information Provider 504 may create and provide supplemental event or location data, or may provide services which transmit event or location data from third party event data providers 518 to a user's personal A/V apparatus 502. Multiple supplemental information providers and third party event data providers may be utilized with the present technology. A supplemental information provider 504 will include data storage for supplemental live event information 510, user location and tracking module 512, information display applications 514, and an authorization component 516.

Supplemental Information Provider 504 includes the supplemental event data for one or more events or locations for which the service is utilized. Event and/or location data can include supplemental event and location data 510 about one or more events known to occur within specific periods and/or about one or more locations that provide a customized experience. User location and tracking module 512 keeps track of various users which are utilizing the system. Users can be identified by unique user identifiers, location and other elements. An information display application 514 allows customization of both the type of display information to be provided to users and the manner in which it is displayed. The information display application 514 can be utilized in conjunction with an information display application on the personal A/V apparatus 502. In one embodiment, the display processing occurs at the Supplemental Information Provider 504. In alternative embodiments, information is provided to personal A/V apparatus 502 so that personal A/V apparatus 502 determines which information should be displayed and where, within the display, the information should be located. Third party supplemental information providers 504 can provide various types of data for various types of events, as discussed herein.

Various types of information display applications can be utilized in accordance with the present technology. Different applications can be provided for different events and locations. Different providers may provide different applications for the same live event. Applications may be segregated based on the amount of information provided, the amount of interaction allowed or other feature. Applications can provide different types of experiences within the event or location, and different applications can compete for the ability to provide information to users during the same event or at the same location. Application processing can be split between the application on the supplemental information providers 504 and on the personal A/V apparatus 502.

FIG. 5C shows another configuration/embodiment in which Supplemental Information Provider 504 is located locally to personal A/V apparatus 502, and Supplemental Information Provider 504 is in communication with Central Control and Information Server(s) 522 via one or more networks 520. In one possible approach, the Central Control and Information Server(s) are provided by the food recommendation server 50 of FIG. 1. In one embodiment, one or more networks 520 can include wired and/or wireless networks, such as a LAN, WAN, WI-FI®, the Internet, an Intranet, cellular network etc. No specific type of network is required. Central Control and Information Server(s) 522 is/are located remotely from Supplemental Information Provider 504.

In one embodiment, Central Control and Information Server(s) 522 provide central control and data storage for multiple Supplemental Information Providers 504, 504a, 504b, . . . which are in communication with respective personal A/V apparatus 502, 502a, 502b, . . . Each of the Supplemental Information Providers 504, 504a, 504b, . . . are at different locations and able to connect to any personal A/V apparatus that is within a geographic region of the respective Supplemental Information Provider.

Figure 6A:
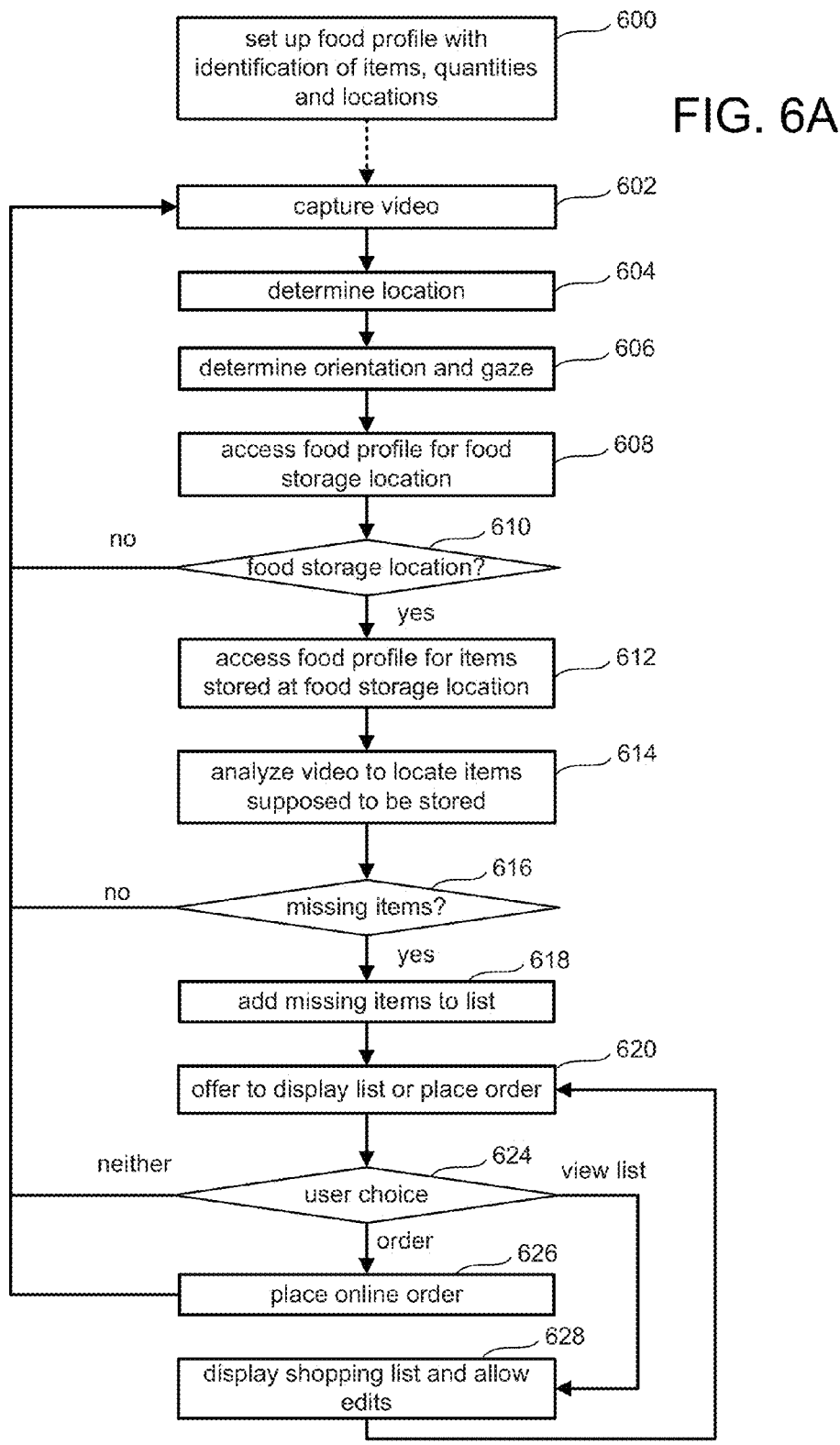
FIG. 6A is a flow chart describing one embodiment of a method for automatically providing a customized list using a personal A/V apparatus.

FIG. 6A is a flowchart describing one embodiment of a process for automatically generating shopping lists. In step 600, a user will set up a food profile. In one embodiment, the profile indicates an identification of all items a user wishes to maintain on premises. For each of those items listed in the food profile, there will be an indication of a quantity of each item required and the location for storing the item. For example, the food profile may indicate that two quarts of milk should be stored in the refrigerator and three loaves of bread should be stored in the pantry. In one example implementation, the food profile is created manually using a keyboard and mouse. In another embodiment, the food profile can be performed using the personal A/V apparatus described above by talking and using speech to text, by using hand gestures, by choosing items in a menu, etc. FIG. 6A shows a dotted line between steps 600 and 602 to indicate that an unpredictable time may exist between these two steps. A food profile could be stored, e.g., at the user's personal A/V apparatus (e.g., HMDD) or other computing device, or at a server such as the food recommendation server 50 of FIG. 1.

FIG. 6B provides an example food profile in accordance with step 600 and 608 of FIG. 6A. The food profile can generally provide a list of food items which are desired to be stored, including the name of the food item, a location in which the food items should be stored, and a desired quantity of each food item. The name of the food item can be set by the user, in one approach, and can include a name brand (e.g., RAGU® sauce) and/or a generic identification (e.g., sauce). In this example, the food items to be stored in a location of "Pantry" and the desired quantities are one each of: "Sauce, low salt; Egg noodles; Brown Rice; Granola; Canned Beans; Pasta; Sauce, meat, and two of "Corn Flakes," and a food item to be stored in a location of "Cupboard" is one item of coffee.

Returning to step 602 of FIG. 6A, as the user moves around, while wearing or otherwise possessing the personal A/V apparatus, the personal A/V apparatus will capture video (and/or still images and/or depth images) of the user's surroundings. In one embodiment, the video captured is a video of the field of view of the user.

FIG. 6C provides an example of a personal A/V apparatus in the form of an HMDD capturing image data. A user 640 wears the HMDD 2 having a front-facing camera 113 with a field of view within boundaries 641-644. A gaze direction is indicated by a line 645. The gaze direction can be defined with respect to an x-y-z coordinate system. A scene 650 includes a storage area which includes food items on a shelf 669. Storage locations, and the arrangement of food items in a storage location, can vary. In one approach, food items are arranged along a shelf and may be arranged side by side, on top of and/or behind one another. Food items in boxes may be arranged so that their end panel is facing outward, as with a box of vegan pasta 652, a box of vegan corn flakes cereal 664, and a box of granola cereal 668. Or, food items in packages may be arranged so that a face of the package is facing outward, as with a can of low salt sauce 656, a bag of egg noodles 658, a jar of meat sauce 660 and box of brown rice 662. A region 655 represents an area which corresponds to the gaze direction 645, and a region 654 represents an outline of the vegan pasta box 652 which can be obtained by image recognition of the box. The regions 654 and/or 655 can be displayed to the user 640 as augmented reality images.

Some food packages include logos which identify nutritional parameters. The logo may be provided on the front, back, side or other location. See FIG. 11D for further details. For example, a V logo 653 identifies the pasta 652 as being vegan, an LS logo 657 identifies the sauce 656 as being low salt or low sodium, a GF logo 663 identifies the brown rice 662 as being gluten-free and the V logo 665 identifies the corn flakes as being vegan.

Foods which are not in packages can also be provided, such as fruits and vegetables.

Any visible portion of a food product, including a package and logo on a package or on the food directly (e.g., a sticker with a logo on a piece of fruit such as an apple or orange), can be used to attempt an identification.

A food item could also have a tag such as an RFID tag which identifies the item to communicate its identification to the personal A/V apparatus when queried by the personal A/V apparatus.

Returning to FIG. 6A, in step 604, the personal A/V apparatus will determine the location of the personal A/V apparatus, as discussed above. In step 606, the personal A/V apparatus will determine its orientation. In addition, the personal A/V apparatus will determine the gaze of the user. See also FIG. 13. In step 608, the personal A/V apparatus will access the food profile of the current food storage location.

In step 604, the system determines the location of the user. For example, the location could be detected based on image recognition of a room the user is in, GPS or cell phone positioning data, and/or by sensing wireless signals from a WI-FI® network, BLUETOOTH® network, RF or infrared beacon, or a wireless point-of-sale terminal, for instance If that location is one or more of the food storage locations mentioned in the user's food profile, then the system will identify all the ingredients/products in the food profile that should be stored at the food storage location that the user is currently in. If the user is not in a food storage location (step 610) then the process moves back to step 602. If the user is in a storage location (step 610), then the system will access the food profile to access all items that are supposed to be stored at the current food storage location that the user is in (step 612). The personal A/V system (in conjunction with Supplemental Information Provider 504 or Central Control and Information Server 522) will analyze the video captured in step 602 to determine whether all the items that are supposed to be at the current location are actually stored at the current location.

FIG. 6D depicts example database records of image data of food items which can be used to analyze camera-captured images. As an example, food products can be identified by Universal Product Code (UPC) identifiers, e.g., a 12-digit number which is used to track food and other items in stores. In this example, UPC10-UPC18 represent the nine food items in the food profile of FIG. 6B. One or more files of images or other data can be associated with each food product. The data in the files provide characteristics regarding the appearance of the food items in a domain which is used for comparison.

Additional items, e.g., apple and orange, do not have UPC identifiers but have one or more files of associated image data. The files of image data are used to perform a comparison with the image data captured by the user's personal A/V device. Any type of pattern recognition and/or machine learning technique can be used. The image data for a given food product can be an image of packaging or the food from one or more perspectives, e.g., from the front or side. Some pattern recognition algorithms are probabilistic in nature, in that they use statistical inference to find the best match for a food product. In this case, the algorithm provides a value of a degree of confidence associated with a choice/potential match. If the degree of confidence is below a threshold level, the user can be instructed to further investigate the food item. See FIG. 12D. The degree of confidence can be expressed by a color code of an augmented reality image, e.g., green for high confidence, yellow for medium confidence and red for low confidence.

The records of image data and the pattern recognition processing can be performed, e.g., at the user's personal A/V apparatus (e.g., HMDD) or other computing device, for instance, or at a server such as the food recommendation server 50 of FIG. 1.

If there are no missing items (step 616), then the process moves back to step 602. If there are items missing from the current storage location, that are in the food profile, then the missing items can be added to a shopping list in step 618.

In one embodiment, a shopping list is stored on the personal A/V apparatus. In other embodiments, the shopping list can be stored at the Supplemental Information Provider. The shopping list can indicate an identification of the item, a description of the item, quantity to purchase.

FIG. 6E depicts an example shopping list. It indicates that one each of corn flakes and canned beans are needed, based on a comparison of the recognized food items and their quantities to the desired food items and quantities in the food profile of FIG. 6B or FIG. 6F. Further, the corn flakes are described as boxed goods which belong in the pantry and the canned beans are described as canned goods which belong in the pantry. In another example, the name can include a brand name (e.g., KELLOGG'S® CORN FLAKES) and the description can include a generic description (e.g., cereal).

Returning to FIG. 6A, in step 620, the personal A/V apparatus can offer to display the list or place an order for the items on the list. In step 624, the personal A/V apparatus will receive a choice from the user, using any of the means described herein. If the user chooses to order the items on the list, then the system will place an online order for the missing food items from step 626, and the process will continue at step 602. If the user requested to view the shopping list, then in step 628, the personal A/V apparatus will display the shopping list through the display of the personal A/V apparatus. The personal A/V apparatus will also allow the user to edit the list. After step 628, the process loops back to step 620. If the user chose not to view the list or not to order the items, then the process (at step 624) will loop back to step 602.

FIG. 6A made use of a food profile for the user. In one embodiment, the system will also include a food inventory. The food inventory will list all the items in the food profile and indicate how many of each item is currently in stock at the user's food storage locations. The food inventory can be stored, e.g., at the user's personal A/V apparatus or other computing device, or at a server such as the food recommendation server 50 of FIG. 1.

FIG. 6F depicts an example food inventory. It lists a product identifier (e.g., UPC identifier), name, storage location, desired quantity, detected quantity and quantity needed (the difference between the desired quantity and the detected quantity). For each item, an indication of the date that the quantity was detected could be provided, so that, if the date was a long time ago, the user could be prompted to view the storage location again to obtain an update of the detected quantities. The user could also verify that a detected quantity is accurate and provide a command which manually overrides a detected quantity.

Figure 7A:
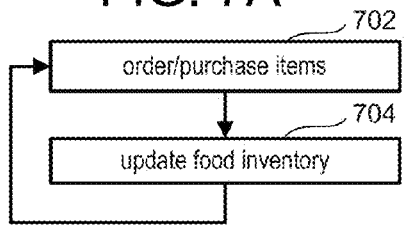
FIGS. 7A and 7B are flow charts describing embodiments of methods for maintaining inventories.
Figure 7B:
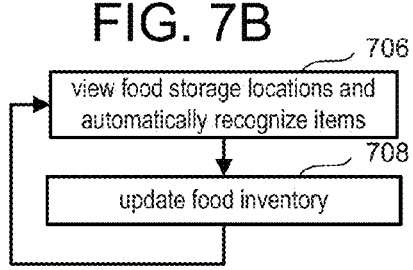

FIGS. 7A and 7B are flowcharts describing a process for maintaining the food inventory. In step 702 of FIG. 7A, as the user orders or otherwise purchases food items, the food inventory will be updated to indicate the new quantity of the food item in step 704.

As the user moves around the user's various food storage locations, the personal A/V apparatus will view these food storage locations (in step 706 of FIG. 7B) and capture still, video and/or depth images of the food storage locations. As the personal A/V apparatus views images of food storage locations, it will automatically recognize items on the food inventory using one or more image recognition processes in conjunction with knowing its three dimensional location and orientation. In step 708, the food inventory will be updated based on recognizing any items to be in stock in the user's food storage location. The food inventory can be stored at or by the personal A/V apparatus and/or the Supplemental Information Provider.

Figure 7D:
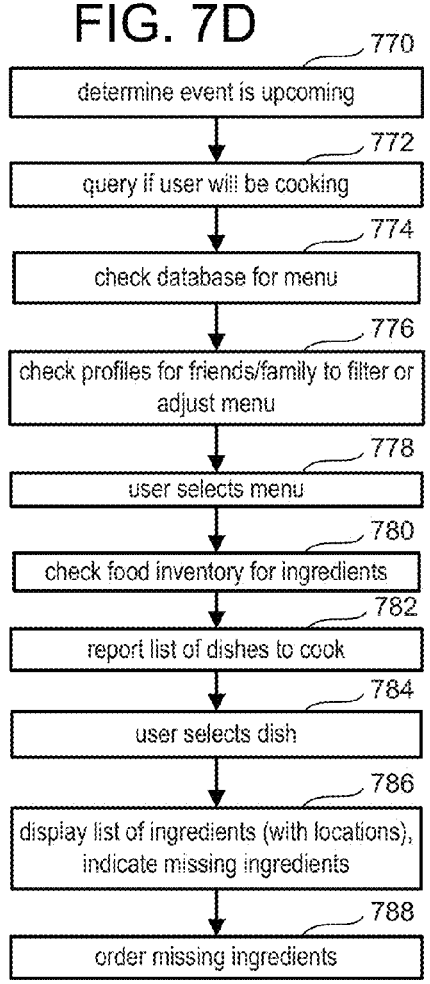
FIG. 7D is a flow chart describing one embodiment of a method for automatically identifying menus using a personal A/V apparatus.
Figure 7C:
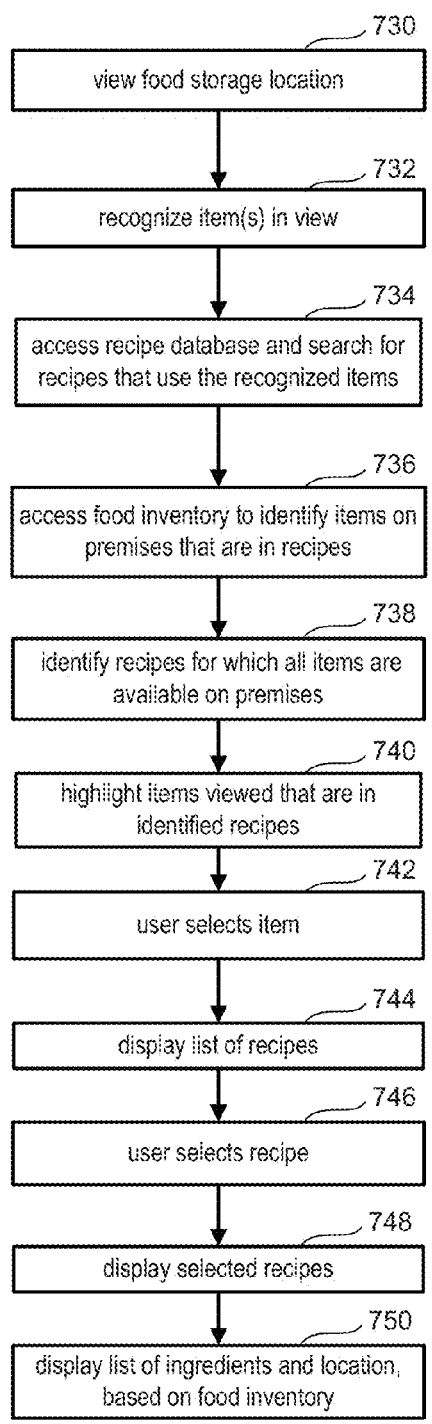
FIG. 7C is a flow chart describing one embodiment of a method for automatically identifying recipes using a personal A/V apparatus.

FIG. 7C is a flowchart describing one embodiment for automatically determining recipes that can be implemented using food items on hand. The process of FIG. 7C can rely on the food inventory discussed above. In step 730 of FIG. 7C, the user will move around the user's various food storage locations and the personal A/V apparatus will view the locations within the field of view of the user. The personal A/V apparatus can capture one or more still, video and/or depth images. In step 732, the personal A/V apparatus will recognize one or more items in view using any of various image recognition techniques known in the art. The personal A/V apparatus can also make use of knowing its three dimensional location and orientation.

The user could also view one, or a small number, of food items individually, such as by holding them in the hand or setting them aside on a counter. The user could ask: "What can I make with these?" to trigger the automatic identification of a recipe which uses those selected ingredients.

In step 734, the personal A/V apparatus will access a recipe database stored on Supplemental Information Provider or Central Control and Information Servers. Upon accessing the database of recipes, the system will search for all recipes that use the items recognized in step 732. In step 736, the system will access the food inventory for the user to identify all items that are on premises for that user and that are in recipes identified in step 734. In step 738, the system will identify those recipes for which all items needed by the recipe are available on premises and at least one item was recognized in step 732.

In step 740, those items in the field of view of the user (determined based on the determining the user's gaze) that are required by the recipes identified in step 738 will be highlighted in the user's field of view. One example of highlighting can be to draw an arrow (or other shape) pointing to the item, changing the color of the item, putting a graphic behind the item or putting a graphic in front of the item. The graphic added to the user's field of view will be added to the display of the personal A/V system, as described above.

Figures 7E, 7F, 7G:
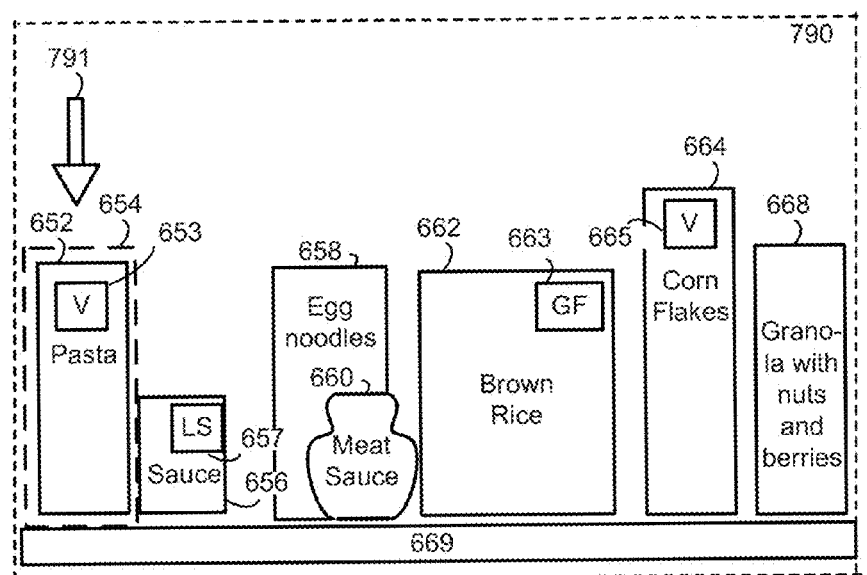
FIG. 7E provides an example of highlighted items in a user's field of view, in accordance with step 740 of FIG. 7D.
FIG. 7F provides an example of profiles for family and friends, including likes and dislikes, in accordance with step 776 of FIG. 7D.
FIG. 7G provides an example of a recipe of a dish to be cooked, in accordance with step 786 of FIG. 7D.

FIG. 7E provides an example of highlighted items in a user's field of view, in accordance with step 740 of FIG. 7D. In a composite image 790 of the storage location, an augmented reality image 791 in the form of an arrow is depicted to highlight the food item 652. The augmented reality image 654 which outlines the box of vegan pasta 652 could also be provided. The augmented reality image 791 is projected to the user at a defined location relative to the food item 652, e.g., above the food item and pointing at the food item, in the field of view of the user. This is a field of view of the augmented reality system. Similarly, the augmented reality image 654 is projected to the user at a defined location relative to the food item 652, e.g., around a border of the food item 652 and conforming to the shape of the food item 652, in the field of view of the user.

Returning to FIG. 7C, in step 742, the user will select, e.g., by a voice command, gesture or other control input, one of the items that are highlighted. In step 744, a list of recipes will be displayed to the user in the personal A/V apparatus. Each of the recipes on the list are those recipes identified in step 738 that use the selected item. In step 746, the user will select one of the recipes listed from step 744. In step 748, the selected recipe is displayed to the user within the personal A/V apparatus. In step 750, the list of ingredients for the displayed recipe will all be displayed within the personal AV apparatus. In one embodiment, the personal A/V apparatus will also indicate the location of each ingredient. The listing of the ingredients and location can be based on information in the food inventory.

For instance, FIG. 8H provides an example recipe which uses the highlighted item (vegan pasta 652) in FIG. 7E. Alternatively, FIG. 7G provides an example recipe which uses the egg noodles 658.

FIG. 7C is a flowchart describing one embodiment of a process for automatically creating a menu for an upcoming event using a personal A/V apparatus. In step 730, the system will determine whether an event is coming up. For example, Supplemental Information Provider 504, personal A/V apparatus 502 or any of the users' computing devices can monitor one or more calendars to determine that a holiday is approaching, a birthday is approaching or the special family event marked on the calendar is approaching. In step 772, the user will be provided with a query asking if the user will be cooking for this holiday or special event. For example, the question can be presented using text in the display for the personal A/V apparatus or an audio question can be posed to the user. If the user is not cooking, the rest of the process of FIG. 7D will not be performed.

If the user is cooking, then in step 774, the system will check a database of menus. This database will have a set of menus and a set of indicators which show which holidays or special occasions each menu is for. Step 774 will include identifying a subset of the menus in the database that are appropriate for the upcoming holiday or special event. In step 776, the system will check profiles for family and friends to determine if there is any indication in any of the profiles for meals or dishes that these people like or dislike.

FIG. 7F provides an example of profiles for family and friends, including likes and dislikes, in accordance with step 776 of FIG. 7D. This profile indicates that the attendees of an event are Jim as a host, and Sue and Joe as guests. Jim likes pasta and dislikes shellfish, Sue likes vegetables and dislikes anchovies, and Joe likes pasta and steak and dislikes broccoli. The likes and dislikes can be input by one user and/or by each user. The likes and dislikes can be accessed from a web site such as a social media web site.

The menus determined in 774 are filtered to remove meals or dishes that are disliked by the user, the user's friends and/or the user's family. For example, any dishes containing shellfish, anchovies or broccoli can be removed from consideration. In one embodiment the filtering is only done for those friends and family who will be attending the event, as indicated by the calendar entry in the user's calendar. In step 778, the resulting set of menus is displayed and the user will select one of the menus.

Referring again to FIG. 7D, in step 780, the system will check the food inventory for all the ingredients in the selected menu. In step 782, the system will report a list of all the dishes that need to be cooked. These listed dishes will be displayed in the personal A/V apparatus. In step 784, the user will select one of the dishes using any of the selection means described above. In step 786, all of the ingredients of the selected dish will be displayed. Next to each ingredient will be an indication of the location that the ingredient is stored in.

Example recipes for dishes are provided in FIGS. 7G and 8H. The recipe of FIG. 7G is for egg noodles and is compatible with Jim's and Joe's like of pasta, and not incompatible with Sue's unstated position on pasta. The ingredients are egg noodles, meat sauce, both located in the pantry, and basil, which is missing or has an unknown location.

The location is obtained from the food inventory discussed above. Additionally, for each of the ingredients listed that the user is not in possession of, there will be an indication that this ingredient is missing. For example, an asterisk can be next to the ingredient or the word "NEEDED" can be displayed next to the ingredient. (See the basil item in FIG. 7G or 8H as an example). Other symbols can also be used.

Referring to FIG. 7D, in step 788, the system orders the missing ingredients from an online service or local store that delivers. The ordering of the missing ingredients can be performed automatically or manually (in response to a user affirmation) from an online seller.

FIG. 8A is a flowchart describing one embodiment of a method for keeping a food profile updated with respect to food restrictions. A food restriction can be a prohibition of a food ingredient which a user is not allowed to have, e.g., due to an allergy or medical condition. For example, some people are allergic to nuts, gluten or extracts such as almond extract. Consumption of an allergen can have severe consequences in some cases.

As another example, a person with heart disease may be prohibited from consuming salty or fatty foods. As another example, a lactose intolerant person avoids dairy products. In other cases, a food restriction may be self-imposed by a person who chooses to avoid certain foods for health, cultural or religious reasons or due to personal tastes. For example, a person strictly following a vegan diet avoids animal products. In this case, foods made from animal products are restricted, and vegan foods are preferred. A food preference can represent a desire to seek out or avoid certain foods. A food restriction can be considered to be a preference to avoid the restricted food. A person who is not strictly following a vegan diet can prefer vegan foods when available. Food preferences can change at different times of the year. For example, during religious holidays, there may be a preference to avoid or seek out certain foods. Food preferences can also change based on the status of a person. For example, preferences can change due to a pregnancy, diet or exercise regimen. These preferences can be accounted for with the techniques provided herein.

Sometimes a grocery store will have a special section on products which address one food restriction. For example, a section with gluten-free products or soy or dairy free products can be provided which make it easy for the user to avoid the one allergen. However, it is more difficult to avoid a combination of allergens. For example, for a food item which is a cake mix, the user would have to carefully read through all of the ingredients to make sure none of them is an allergen. The techniques provided herein are valuable in that they can automatically identify one or more allergens. The techniques are also helpful when the user shops in an unfamiliar store, in that the nutritional parameters of unfamiliar food items can be quickly identified and substitute products located.

In step 802, the food profile is manually updated to indicate food restrictions for the user, the user's family and/or friends. In one example implementation, the user will use a keyboard of a computer, laptop, PDA, etc. to manually enter in data (allergies, diets, etc.) into the user's food profile. In other embodiments, the user can talk into a microphone for a personal A/V apparatus or other computing device. In other embodiments, the user can use other input devices to enter information. In step 804, the food profile is automatically updated to indicate food restrictions for the user, family and/or friends based on doctor reports. For example, if a doctor determines that a user is allergic to a particular food item, that information can be automatically added to the user's food profile. In one example implementation, doctor reports can be provided to the system (Supplemental Information Provider and/or Central Control and Information Server) that keeps track of user profiles, via the doctor computing device 1 of FIG. 1. An allergy doctor can input into the system current allergies and new found allergies from recent tests as well for a user.

FIG. 8F provides an example of a food profile in accordance with steps 802 and 804 of FIG. 8A, showing preferences/restrictions of different users, special identification of allergens and their severity and association of the preferences/restrictions of selected users. In this example, allergens are included under the food preferences/restrictions but are also listed separately with an associated severity level. The special treatment of allergens is due to the possibility of a potentially life threatening reaction by a specific user if an allergen is consumed or encountered. The severity can be low, medium or high, for instance. A low, medium or high severity can be set for an allergen which is likely to result in a mild, moderate or severe reaction, respectively, for a given user. For a given user, an associated user is another person whose food preferences/restrictions are of concern. For example, this can be another user in a family which eats common meals, or a guest at a dinner party. The food preferences/restrictions of the associated user can be included with the food preferences/restrictions of the given user, so that foods are selected which meet the preferences/restrictions of all associated users.

In this example, the preferences/restrictions of Jim are: low salt (low salt foods are preferred), heart healthy (heart healthy foods are preferred), and nut allergy, the allergen is nuts (nuts are to be avoided), the allergen severity is high, and the associated user is Sue. The preferences/restrictions of Sue are: vegan (vegan foods are preferred) and the associated user is Jim. The preferences/restrictions of Joe are: lactose intolerance (lactose-containing foods such as dairy are to be avoided). The preferences/restrictions of a user could alternatively be divided into foods which are preferred and foods which are not preferred. A weight can be assigned to each preference for use in recommending foods. For example, Sue may have a moderate preference for vegan foods, e.g., a weight of 5 on scale of 0-10, while another user who is a strict vegan may have a preference for vegan foods with a weight of 10. A food item that is more highly weighted, or menu selection containing the food item as an ingredient, is more likely to be recommended. As another example, a user could have a preference to eat low calorie meals which have fewer than a threshold number of calories.

In the food profile, an identifier associated with a user is linked to at least one nutritional preference associated with the user.

FIG. 6A, as discussed above, provides a method for automatically creating shopping lists. FIG. 8B shows a modification to the method of FIG. 6A to include accounting for food restrictions. Note that the steps of FIG. 6A are shown in FIG. 8B with dotted lines. The new steps are shown with solid lines. After step 616 of FIG. 6A, the system can perform step 810, which includes checking the food profile in the user profile to see if there is a food restriction associated with the item that is missing. For example, looking back at FIG. 6A, the system is adding missing items to a shopping list. FIG. 8B adds in new step 810 that (before adding the item to the list) determines if there is a food restriction. If there is no restriction (step 812), then the missing item is added to the list in step 618 of FIG. 6A. If there is a food restriction found (step 812), then the missing item is not added to the shopping list instead, the process of FIG. 6A will loop back to step 602 without performing step 618.

A food restriction may be associated with the missing item when an ingredient or nutritional parameter of the missing item conflicts with the food profile of a user such as in FIG. 8F. For example, for a low salt restriction, the food may not contain more than a certain amount of sodium per serving. For a heart healthy restriction, the food may not contain more than a certain amount of saturated fat per serving. For a vegan restriction, the food may not contain animal products. For a lactose intolerance restriction, the food may not contain milk. For an allergy, the food may not contain the allergen or more than a trace amount of the allergen.

FIG. 8G depicts an example of nutritional parameters of food items, for use in determining whether there is a restriction or incompatibility associated with a food item, such as for use in connection with step 810 of FIG. 8B, step 820 of FIG. 8C, and step 830 of FIGS. 8D and 8E. The data can be stored, e.g., at the user's personal A/V apparatus or other user computing device, or at a server such as the food recommendation server 50 of FIG. 1. The data includes an entry for each food item in the food inventory of FIG. 6F. The entries include: (product id; name; ingredients; compatible with; incompatible with) as follows: (UPC10; sauce, low salt; tomatoes, oil, sugar; Vegan, low salt; n/a), (UPC11; Egg noodles; flour, water, egg, salt, butter; n/a; Vegan, low salt, heart healthy), (UPC12; Brown rice; brown rice; Vegan, low salt, heart healthy, gluten-free; n/a), (UPC13; Corn flakes; milled corn, sugar, malt flavoring, salt; Vegan, heart healthy; Low salt, gluten free), (UPC14; Granola; rolled oats, nuts, berries, honey, salt; Vegan; gluten-free, nut allergy), (UPC15; Canned beans; beans, water, salt; Vegan, heart healthy; n/a), (UPC16; Pasta; wheat flour, water; Vegan, heart healthy, low salt; n/a), (UPC17; Sauce, meat; tomatoes, meat, oil, salt, sugar; n/a; Vegan, vegetarian, heart healthy, low salt); (UPC18; Coffee; Arabica coffee; Vegan, heart healthy, low salt; n/a). The term "n/a" means "not applicable."

Generally, the ingredients of food items are known by their manufacturers and can be stored in a database in a central server such as the food recommendation server 50. The manufacturer or a third party such as an independent standards body or government agency, can designate that a food item is compatible with a particular parameter such as vegan, low salt, heart healthy, gluten free and so forth.

The list of nutritional parameters can account for the fact that some ingredients are known by different names, so that multiple names are treated as one ingredient. For example, durum flour and semolina flour are forms of wheat flour.

Other examples of nutritional parameters include, per serving: calories, fat, vitamins and minerals, points under a weight loss program and so forth. An example of a weight loss program is the WEIGHTWATCHERS® POINTSPLUS® program, where a point accounts for a food's protein, carbohydrates, fat, and fiber, and the user has a goal of eating meals which do not exceed a point threshold. For a person on a low calorie diet, a food item which has fewer than a threshold number of calories per serving may be recommended. For a person on a weight loss program, a food item which has fewer than a threshold number of points per serving may be recommended. For a person with an iron deficiency (anemia), a food item which has a relatively high amount of iron per serving may be recommended.

In the records, an identifier of a food item is linked to at least one nutritional parameter of the food item.

FIG. 7C, described above, depicts a process for automatically discovering recipes that can be made with food items on hand. FIG. 8C shows a modification to the process of FIG. 7C, which accounts for food restrictions. Step 732 of FIG. 7C includes recognizing an item. The process of FIG. 7C will then use that item recognized to identify recipes. Before identifying the recipes, the process (enhancement) of FIG. 8C will check the food profile (e.g., FIG. 8F) to see if there is a food restriction associated with the items that were recognized in step 732. If there were no food restrictions found, then the process will continue with step 734, as described with respect to FIG. 7C. However, if step 820 found a food restriction (step 822), then step 734 will skip the item that has a food restriction. That is, step 734 will be performed; however, any food item that has a restriction will not be used to access recipes. The process will then continue (after performing step 734) with step 736.

For example, FIG. 8H provides an example recipe which does not include restricted food items, in accordance with step 824 of FIG. 8C. For example, consider an example in which the recipe for egg noodles was selected based on likes and dislikes of the people attending a meal, as set forth in FIG. 7F. However, the egg noodle recipe does not factor in preferences/restrictions of the people as set forth in FIG. 8F. For instance, Jim's low salt restriction rules out the meat sauce due to a high sodium content. Jim's heart healthy restriction similarly rules out the meat sauce due to the meat. Red meat is assumed to be incompatible with a heart healthy diet. Sue's vegan restriction rules out the egg noodles because of eggs and the meat sauce because of meat (both eggs and meat are animal products). Joe's lactose intolerance restriction is compatible with the egg noodle meal, but the meal is modified to be compatible with all diners. The vegan pasta meal of FIG. 8H substitutes vegan pasta for egg noodles to provide compatibility with Sue's restriction, while substituting low salt (non-meat) sauce for meat sauce, to provide compatibility with Jim's and Sue's restrictions.

In one approach, to obtain the compatible recipe, a database can be accessed of foods which are substitutes for one another. For example, vegan pasta is a substitute for egg noodles, and low salt (non-meat) sauce is a substitute for (salty) meat sauce.

FIG. 8D describes another change to the process of FIG. 7C to account for food restrictions. Step 738 of FIG. 7C includes identifying all recipes for which all items are available on premises. After step 738, step 830 of FIG. 8D will include checking all ingredients of all the recipes identified at step 738 against the food profile to see if any of the ingredients in any of the recipes has a food restriction. In step 832, the recipes will be filtered such that any recipe having an ingredient that has a food restriction will be removed from the list of recipes. The process will then continue with step 740.

FIG. 7D (described above) illustrates a process for identifying appropriate menus. In step 776 of FIG. 7D, the system will check profiles of family and friends to filter out or adjust the menus previous identified. After filtering based on the likes of family and friends (e.g., based on the food profile of FIG. 7F), step 830 of FIG. 8E will include checking all the ingredients in all the menus that survived the previous filtering to determine whether any of the ingredients have a food restriction (e.g., based on the food profile of FIG. 8G). In step 832, any menu or recipe that has a food item with a food restriction will be filtered out of the list. The process will then continue with step 778, as discussed above.

Figure 9B:
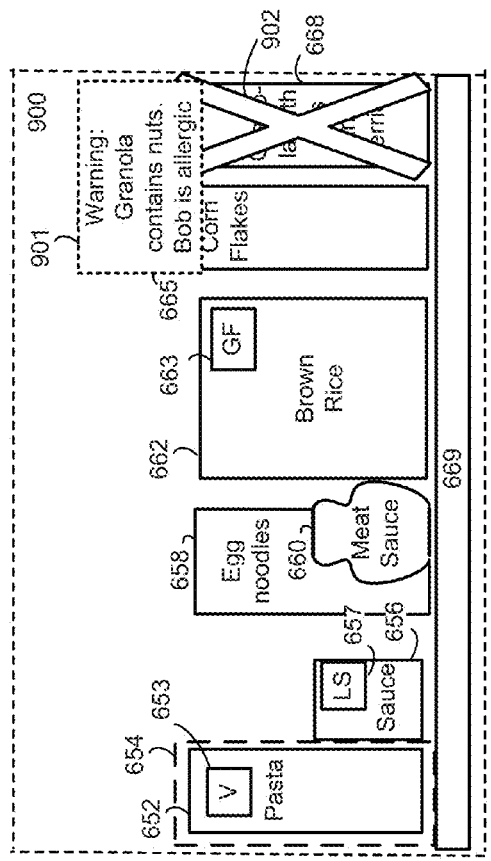
FIG. 9B depicts an example composite image 900 of a food storage location with an augmented reality image 654 highlighting a food item 652 in a recipe in accordance with step 740 of FIG. 7C or 7D, and augmented reality images 901 and 902 providing information on and blocking, respectively, a restricted food item 668 in accordance with step 860 of FIG. 9A1.

FIG. 9A1 is a flowchart describing one embodiment of a process that includes accounting for food restrictions when the user is looking at food items through the personal A/V apparatus. In step 850, the user will view a food storage location or other area that has food items in it. For example, the user could be looking at food in a supermarket or other type of store. In step 852, the personal A/V apparatus (in conjunction with one or more other servers) will recognize the items in the field of view of the user, as described above. In step 854, the system will check each of the items recognized against the food profile to see if any of the food items are associated with a food restriction. For example, personal A/V apparatus 502 of FIGS. 5A and 5C can access Central Control and Information Server 522 to determine whether the user profile indicates that any of the items recognized have a food allergy or dietary restriction associated with them. If none of the food items have a food restriction associated with them (step 856), then no changes are made to the view due to food restrictions (step 858). If any of the food items recognized are associated with a food restriction, then the system can do one of two things in step 860. In one alternative, the system could highlight the items that have a food restriction and graphically indicate what the restriction is. For example, a pointer can point to a food item and say that the user has an allergy or that that particular food item is not part of the user's diet. FIG. 9B, discussed further below, provides an example augmented reality image which highlights and at least partially blocks a restricted food item.

Figure 9C:
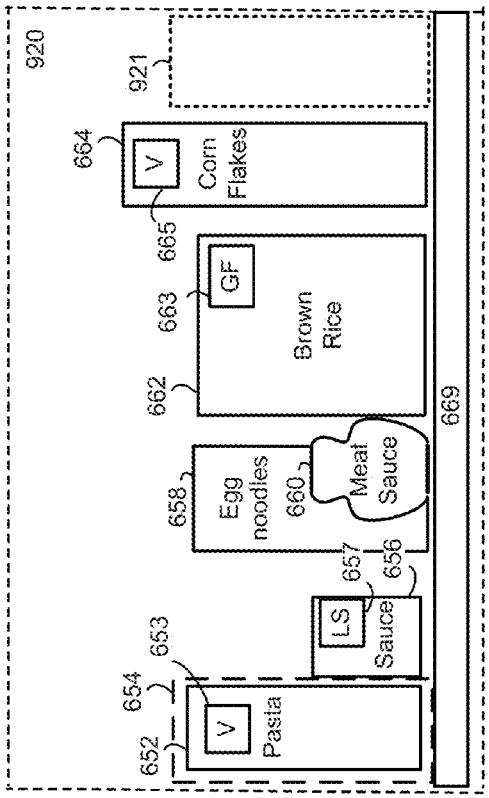
FIG. 9C depicts an example composite image 920 of a food storage location with an augmented reality image 654 highlighting a food item 652 in a recipe in accordance with step 740 of FIG. 7C or 7D, and an augmented reality image 921 erasing a view of a restricted food item 668 in accordance with step 860 of FIG. 9A1.

Alternatively, the item for which there is a food restriction can be erased from the view. There are many methods for erasing images from a view. In one embodiment, an image can be erased by placing another graphic image in front of it. The graphic placed in front could include an image of another item or an approximation of the view behind the item. FIG. 9C, discussed further below, provides an example augmented reality image which erases a restricted food item.

Alternatively, or additionally, step 853 can be performed to display one or more nutritional parameters of a food item, such as, per serving: calories, fat, vitamins and minerals, points under a weight loss program and so forth.

Generally, in the various embodiments described herein, as an addition or alternative to displaying an augmented reality image to a user, such as regarding a food recommendation, audio, such as in the form of spoken words or other sounds (e.g., a jarring buzzer for foods that are not recommended or a pleasing chime for foods that are recommended), can be provided by the HMDD or other personal A/V apparatus.

FIG. 9A2 is a flowchart describing one embodiment of a process at a server for recommending food to a user. Step 950 includes receiving a request from a head-mounted display device worn by a user (step 950). The request can include: (a) an identifier associated with the user and (b) image data of a scene, where the scene comprises a food item. Step 952 includes detecting an identifier of the food item from the image data. Step 954 includes, responsive to the detecting, accessing a data source using the identifier of the food item and the identifier associated with the user. The accessing the data store can include identifying at least one nutritional preference associated with the user based on the identifier associated with the user, and identifying at least one nutritional parameter of the food item based on the identifier of the food item. Step 956 includes, based on the accessing of the data source, providing a determination as to whether or not the food item is recommended for the user. This can include comparing the at least one nutritional preference associated with the user to the at least one nutritional parameter of the food item. Step 958 includes communicating data indicating the determination to the head-mounted display device.

FIG. 9B depicts an example composite image 900 of a food storage location with an augmented reality image 654 highlighting a food item 652 in a recipe in accordance with step 740 of FIG. 7C or 7D, and augmented reality images 901 and 902 providing information on and blocking, respectively, a restricted food item 668 in accordance with step 860 of FIG. 9A1. In this case, the augmented reality image 902 is in the shape of an "X" which appears over the granola 668 as the restricted food item. Additionally, the augmented reality image 901 provides a text message of: "Warning: Granola contains nuts. Bob is allergic." This message is generated based on a comparison of the food profile of FIG. 8F to the ingredients/nutritional parameters of FIG. 8G.

The augmented reality image 902 is projected to the user at a defined location relative to the food item 668, e.g., centered in front of the food item 668, in the field of view of the user. The augmented reality image 901 is also projected to the user at a defined location relative to the food item 668, e.g., above and near a top of the food item 668.

FIG. 9C depicts an example composite image 920 of a food storage location with an augmented reality image 654 highlighting a food item 652 in a recipe in accordance with step 740 of FIG. 7C or 7D, and an augmented reality image 921 erasing a view of a restricted food item 668 in accordance with step 860 of FIG. 9A1. In this case, the augmented reality image 921 is in the shape of a blank area which appears over the granola 668 as the restricted food item. Instead of a blank area, the augmented reality image 921 could attempt to represent a background or surrounding region of the granola 668, e.g., in terms of color, lighting, and shapes. In one approach, the augmented reality image 921 has the appearance of the back of a storage cabinet or shelving structure.

The augmented reality image 921 is projected to the user at a defined location relative to the food item 668, e.g., centered in front of the food item 668, in the field of view of the user.

Figure 10A:
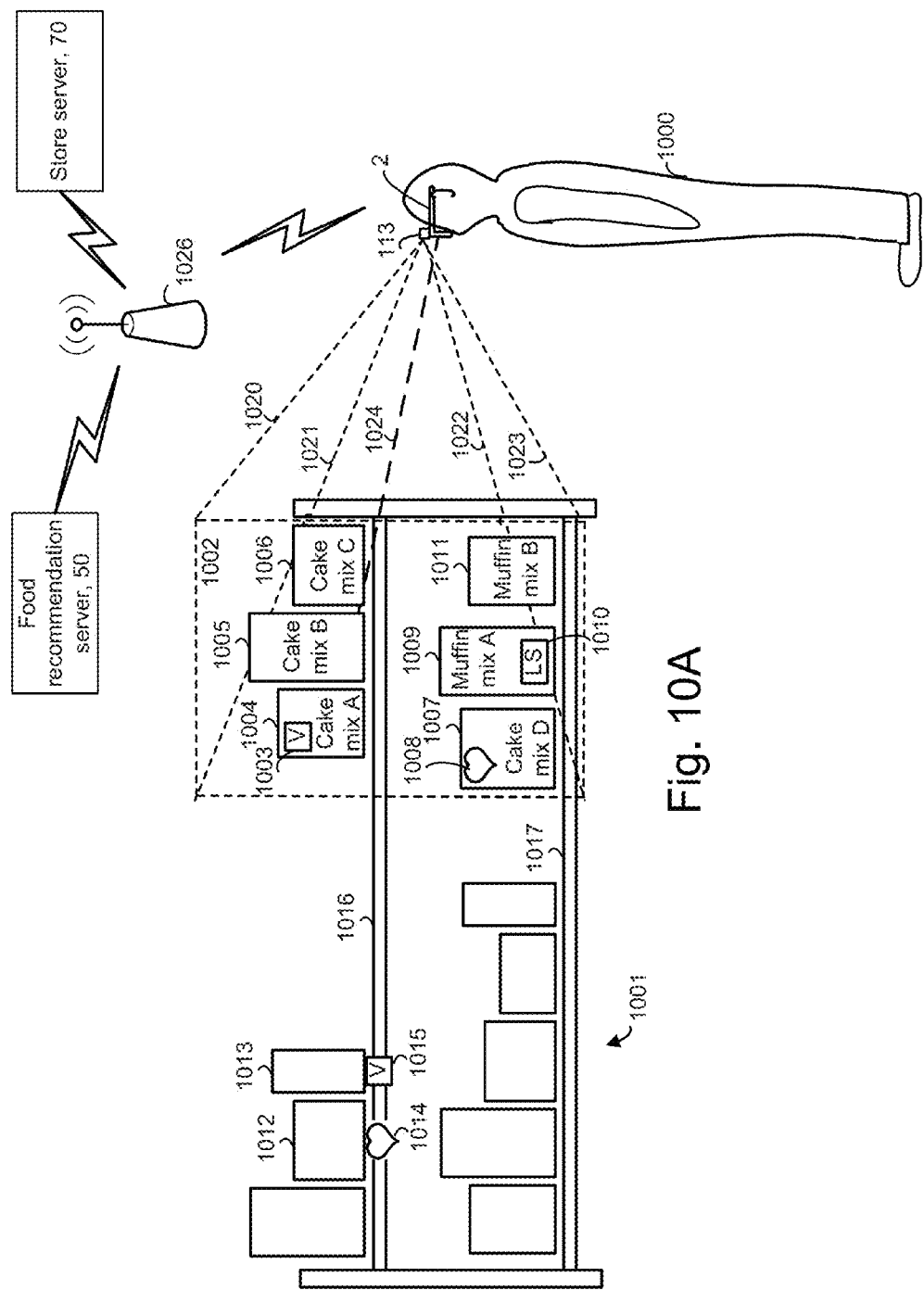
FIG. 10A depicts an example scenario in which an HMDD-wearing user 1000 looks at food items on a shelving structure 1001 in a store.

FIG. 10A depicts an example scenario in which an HMDD-wearing user 1000 looks at food items on a shelving structure 1001 in a store. A user 1000 wears the HMDD 2 having a front-facing camera 113 with a field of view within boundaries 1020-1023. A gaze direction is indicated by a line 1024. The forward-facing camera captures images of a scene portion 1002 in a food store, for instance. A food store can include a facility which sells food or gives it away. The shelving structure 1001 includes shelves 1016 and 1017. Food stores typically display their products with the front surface facing forward, although other options are possible such as the side or top surface facing forward. Related items can be displayed together. Additional information for a food item is sometimes attached to the shelf below the food item. For example, a heart-shaped logo 1014 is attached to the shelf 1016 to identify a food item 1013 as a heart healthy item. Similarly, a V-shaped logo 1015 is attached to the shelf 1016 to identify a food item 1012 as a vegan. Such logos may also be present on the food item. For example, the vegan logo 1003 is on the food item 1004 (Cake mix A), no logo is on item 1005 (Cake mix B) or item 1006 (Cake mix C), the heart healthy logo 1008 is on item 1007 (Cake mix D), the low salt (LS) logo 1010 is on item 1009 (Muffin mix A) and no logo is on item 1011 (Muffin mix B).

In this example, the HMDD 2 communicates with the food recommendation server 50 via a wireless access point 1026 at or near the store. The HMDD 2 could also communicate with the store server 70. In one approach, images captured by the HMDD 2 are transmitted to one of the servers to identify one or more food items in the user's field of view. The servers may also communicate with each other.

A transmission from the HMDD may be in the form of a request which includes an identifier of the user, so that a recommendation regarding the food item is personalized to the user. However, it is also possible for the transmission to not include an identifier of the user, so that a recommendation or other information regarding the food item is generic but still useful. The one or more servers, as data sources, process an image to identify a food item or logo in the image, access nutritional parameters of the identified food item or logo, access preferences/restrictions of the user based on the user identifier, and compare the nutritional parameters to the preferences/restrictions to provide a recommendation regarding a food item being view, substantially in real time. The recommendation can be positive, indicating the nutritional parameters are compatible with the preferences/restrictions, or negative, indicating the nutritional parameters are incompatible with the preferences/restrictions. It is also possible to provide degrees of compatibility or incompatibility, or to provide a neutral recommendation. For instance, for a low salt food restriction, a food item which has no salt could receive a strong positive recommendation while a food item which has some salt, but a relatively low amount (e.g., less than a certain amount per serving, e.g., 150 mg or less) could receive a moderately positive recommendation.

The recommendation can be communicated as data back to the user's HMDD to provide an augmented reality image which informs the user of the recommendation. For example, a recommended food item can be highlighted in color coding, where the color indicates the recommendation, e.g., flashing green for strongly recommended, steady green for recommended, yellow (or not highlighting) for neutral, and red for not recommended. The augmented reality image could also display text to the user informing the user of the reasons for the recommendation ("this product has no salt" or "this product has low salt") and of the nutritional parameters ("this product has 100 mg of salt per serving"). The user can be informed of the recommendation in other ways as well, such as by an audio message or tone (e.g. a pleasing bell for a positive recommendation or a warning horn for a negative recommendation).

A recommendation can be displayed concurrently for multiple items in the user's field of view, allowing the user to quickly evaluate the food items and choose the best option, and/or to avoid an undesirable or harmful item.

The recommendation can also suggest substitute, compatible food items and inform the user of where they are in the store. If the substitute item is within the field of view of the user, it can be highlighted by an augmented reality image. If the substitute item is not within the field of view of the user, the augmented reality image can provide information such as: "go to aisle 5a to substitute vegan pasta for egg noodles," or provide an arrow which points in the direction of the substitute. In this case, the server knows that the substitute is in the store's inventory and is expected to be displayed at a known location in the store. The store has a known arrangement of food items in different areas of the store, and the augmented reality image indicates one of the areas of the store which has the substitute food item, based on the known arrangement.

FIG. 10B depicts an example scenario in which an HMDD-wearing user 1000 looks at an individual food item 1033 in a store or other location. The user 1000 wears the HMDD 2 having a front-facing camera 113 with a field of view within boundaries 1031 and 1034. A gaze direction is indicated by a line 1032. An image of the single food item 1033 can similarly be captured and communicate to a server to obtain a recommendation regarding the food item. A recommendation can be displayed for the single item, allowing the user to quickly evaluate the food item. The user can issue a command such as "identify," or the identification can be initiated automatically such as based on a determination that the user has a fixed gaze or head orientation for a specified amount of time.

FIG. 10C depicts an example layout of a store 1040, and antennas 1060-1062 used to determine a position 1070 of the HMDD-wearing user 1000 of FIG. 10A. A user's location within a store can be determined in different ways. In one approach, multiple antennas 1060-1062 are positioned around the store or elsewhere communicate wirelessly with the HMDD, so that an exact location 1070 of the HMDD and user 1000 can be determined by triangulation. In another approach, the HMDD uses GPS data to pinpoint its location. In another approach, the HMDD receives signals from RF beacons which are placed around the store. The location of the user may be determined to be a certain aisle of the store, for instance. For instance, one beacon can be placed in each aisle. The store includes Aisles 1A and 1B with shelves 1042 (with example food item 1041) and 1044, respectively, in an area 1043; Aisles 2A and 2B with shelves 1046 and 1048, respectively, in an area 1045; and Aisles 3A and 3B with shelves 1050 and 1052, respectively, in an area 1051. A store identifier can be transmitted by the antennas.

FIG. 11A depicts example records of inventory data of different stores including the store 1040 of FIG. 10C. The records can be stored at the food server 50 or store server 70, for instance. For each store, an identifier and location are provided. The location can allow the store to be identified by GPS data, for instance. The product identifier, name, logo identifier and location in the store are also provided. By knowing the user's location in the store, the number of food items which the user is potentially viewing is reduced. A pattern matching/image recognition process can be run to match food items in a camera-captured image to image data of food items in the area of the user, while excluding food items outside the area. A further narrowing of the number of candidate items can be made by knowing a direction in which the user is looking (a gazed upon area of a scene in a store), e.g., based on a detected gaze direction and/or head orientation. Processing load can thereby be reduced, compared to the case of matching food items in a camera-captured image to image data of food items of an entire store inventory.

The pattern matching/image recognition process could also be made more efficient by classifying the food items in the inventory according to visual characteristics of the food items, e.g., by color characteristics, reflectivity or shape, including absolute size such as height and width, or relative proportions such as aspect ratio (height/width). For example, if a food item in a camera-captured image has a high aspect ratio, the pattern matching/image recognition process can exclude image data of food items in the inventory having a low or medium aspect ratio. Thus, no attempt need be made to match to a food which is known to have a markedly different visual characteristic. In another approach, the identification of a first food item can be facilitated by identifying another food item, based on a known arrangement of items on store shelves. A first food item which is relatively easy to identify (e.g., due to a prominent or unusual shape or size or color scheme) can be identified first. Next, a second food item which would be otherwise be hard to identify by itself (e.g., due to a common shape or size or color scheme) can be identified based on its known relative position to the first food item (e.g. same shelf, to the left).

For store SID1, the entries are in the format (product id; name; logo id; location in store) as follows: (UPC1; Cake mix A; V; Aisle 2A), (UPC2; Cake mix B; Aisle 2A), (UPC3; Cake mix C; Aisle 2A), (UPC4; Cake mix D; HH; Aisle 2A), (UPC5; Muffin mix A; LS; Aisle 2A), (UPC6; Muffin mix B; Aisle 2A), and (UPC2; Cookie mix; Aisle 3A). For store SID2, the entries are in the format (product id; name; logo id; location in store) as follows: (UPC1; Cake mix A; V; Aisle 4A), (UPC3; Cake mix C; Aisle 4A), (UPC6; Muffin mix B; Aisle 4B), (Apple1; Apple, red; Aisle 1A), and (Orange; orange; Aisle 1A). Typically, different stores have items in common and store-specific items.

FIG. 11B depicts product nutritional parameters for products (items) of the inventory of FIG. 11A. Similar to FIG. 8G, information for the items in store SID1 is listed, as an example. The entries are in the format (product id; ingredients; compatible with; incompatible with) as follows: (UPC1; enriched flour, sugar, flavoring, baking powder, salt; Vegan; Low salt, heart healthy), (UPC2; enriched flour, sugar, eggs, oil, salt; n/a; Vegan, low salt, heart healthy), (UPC3; enriched flour, sugar, eggs, sugar, salt; Organic; Vegan, low salt, heart healthy), (UPC4; whole wheat flour, sugar, milk, salt; Heart healthy; Vegan, low salt), (UPC5; enriched flour, sugar, eggs; Low salt; Vegan, heart healthy), (UPC6; enriched flour, sugar, eggs, oil, salt, peanuts; n/a; Vegan, low salt, heart healthy, nut allergy), and (UPC7; enriched flour, sugar, oil, salt; Vegan; low salt, heart healthy).

In this example, the presence of enriched flour is assumed to be incompatible with a heart healthy preference, and the presence of salt, eggs or nuts is incompatible with a low salt, vegan or nut allergy restriction, respectively.

Other examples of nutritional parameters can also be provided. These include, per serving: calories, fat, vitamins and minerals, points under a weight loss program and so forth.

FIG. 11C depicts example records of image data for products of the inventory of FIG. 11A. Similar to FIG. 6D, in this example, UPC1-UPC7, apple1 and orange represent each of the unique food items in the inventory in FIG. 11A. One or more files of image data can be associated with each food product. The files of image data are used to perform a comparison with the image data captured by the user's device, to recognize the food item in the image. Any type of machine learning technique, one example of which is pattern recognition, can be used.

FIG. 11D depicts example records of logo images for products of the inventory of FIG. 11A. There are many logos currently in use and one or more images or other characterizing data of each can be identified by one or more files as follows by (logo id, logo image file; description): (V; V.file1, V.file2; Vegan), (HH; HH.file; Heart Healthy), (LS; LS.file; Low sodium), (KO; KO.file; Kosher), (LC; LC.file; Low calorie), (WG; WG.file; Whole Grain), (VG; VG.file; Vegetarian), (OR; OR.file; Organic), (FF; FF.file; Fat-Free), (SF; SF.file; Sugar-Free), (NF; NF.file; Nut-Free), (WF; WF.file; Wheat-Free), (GF; GF.file; Gluten-free), (HF; HF.file; High fiber), (FT; FT.file; Fair Trade Certified), (WA; WA.file; WAL-MART® Great For You), (ER; SA.file; Safeway® Eating Right!), and (HC; HC.file; Health Check™, Heart and Stroke Foundation).

As mentioned, logos can be provided on food items which have certain ingredients or which meet nutritional parameters which may be set as store, industry or government certifications or standards (e.g., by the USDA in the United States). For instance, logos provided in FIGS. 11E and 11F are used for vegan foods. FIGS. 11E and 11F depict example logo images for the vegan logo images files V.file 1 and V.file2, respectively, of FIG. 11D.

When running a pattern matching process to compare captured images with images of food items, it is possible to match to the overall food item such as a front surface of a package, a portion of the overall food item, a logo which is on the package, and/or a logo or other sign which is adjacent to or otherwise proximate to the food item (such as logos 1014 and 1015 proximate to food items 1012 and 1013, respectively). In another approach, it is possible to match to an unpackaged food item (such as a piece of fruit), and/or to a logo which is on the food item (such as on a sticker which is attached to the food item).

By identifying a logo of a food item, a significant amount of information which is sufficient to provide a valuable recommendation is obtained even if the specific food item is not identified. Moreover, the amount of processing can be substantially reduced by identifying the logo without identifying the food item. Even if a food item is identified, a store inventory can be arranged to include any logo, so that a food item can be identified by first identifying the logo, then considering a subset of food items in the inventory which have the logo, and not considering a subset of food items in the inventory which do not have the logo.

Further, the number of candidate logos can be reduced by knowing that some stores use only certain logos on their products. Also, logos tend to be prominently displayed on food item in a standardized manner, facilitating their identification.

FIG. 12A depicts an example process for recognizing food items in a view, in accordance with step 706 in FIG. 7B, step 732 of FIGS. 7C and 8C, and step 852 in FIG. 9A1. The process also includes a scenario for recognizing a menu selection at a restaurant, as discussed further below in connection with FIGS. 15-18.

Example steps, some of which are optional, include: Launch application, 1200 (such as by the user entering a command when in a store/restaurant, or automatically by detecting when the user is in a store/restaurant); HMDD determines identifier and/or location of store/restaurant (such as from a local access point identifier, or by cross referencing GPS data to store/restaurant location), 1202; HMDD determines particular area of store (such as an aisle), 1204; HMDD determines gaze direction and/or head orientation of user, 1206; Determine gazed-upon area of scene based on gaze direction and/or head orientation of user, 1208; Obtain image data of scene from forward-facing camera of HMDD, where scene includes a food item/menu selection, 1210; and Crop image to gazed-upon area of scene, 1212.

In one approach, if the user has a fixed gaze or head orientation for a minimum period of time, such as a couple of seconds, this may be an indication that the user is staring at an item or otherwise giving their attention to an item. This can be a trigger to initiate capturing an image of scene and processing it to identify food items in the image.

Subsequently, the flow can follow one of two branches. In a first branch, processing occurs at the HMDD. In a second branch, processing occurs at a server. For example, the first branch includes: HMDD processes image data to obtain food item/menu selection identifier, 1214; HMDD determines whether or not the food item/menu selection is recommended for the user, 1216; and HMDD provides augmented reality image based on the determination, 1218. The second branch includes: Transmit image data with user identifier, and store/restaurant identifier and/or identifier of area of store, to server, 1220; Server processes image data to obtain food item/menu selection identifier, 1222; Server determines whether or not the food item/menu selection is recommended for the user, 1224; and HMDD receives data based on determination from server, 1226.

In another option, processing is shared by both the HMDD and server. For example, the HMDD can process the image data to obtain the food item/menu selection identifier at step 1214, then communicate the food item/menu selection identifier to a server, which determines whether or not the food item/menu selection is recommended for the user, and communicates a recommendation back to the HMDD for use in providing an augmented reality image based on the determination. Having the server process the image data can be more efficient since the server generally will have more processing power.

In another example of shared processing, the server can process the image data to obtain the food item/menu selection identifier, then communicate the food item/menu selection identifier to the HMDD, which determines whether or not the food item/menu selection is recommended for the user. This allows the personal food profile of the user to be maintained at the HMDD, reducing the threat of a privacy violation.

FIG. 12B depicts further details of steps 1214 or 1222 of FIG. 12A. Regarding the processing of the image data, this can include: Identify inventory corresponding to store/restaurant identifier and/or identifier of area of store, 1230; Compare image data to images of packaging and/or logos, and/or compare text using OCR, for identified inventory, 1232; and Identify matching packaging, logo and/or text, determine degree of confidence in match, 1234.

Figure 12C:
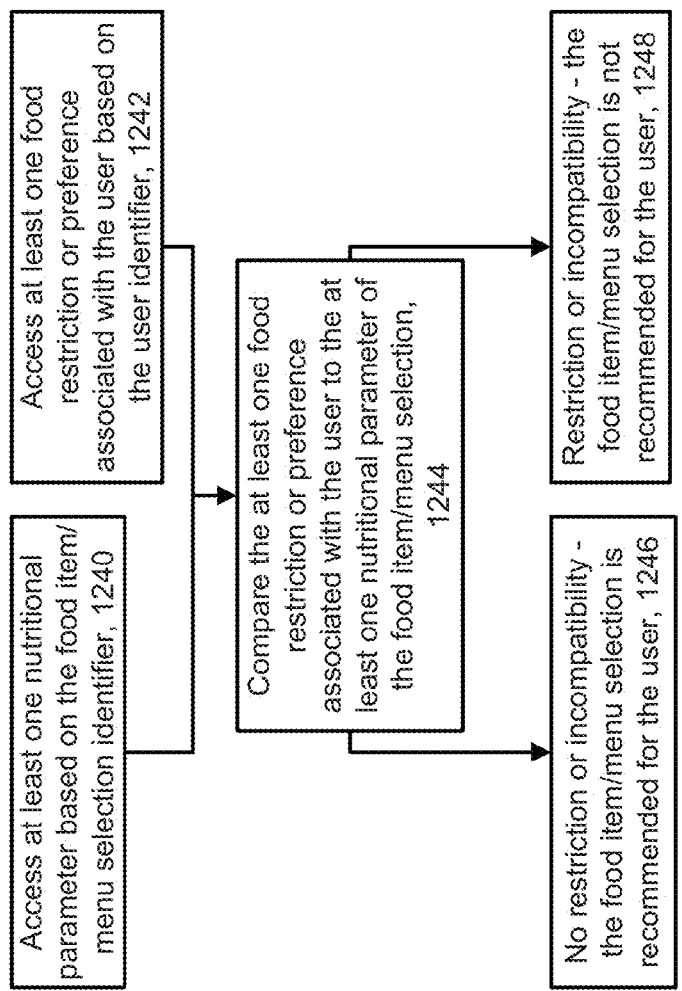
FIG. 12C depicts an example process for checking a food profile to detect a food restriction or other incompatibility, in accordance with step 810 in FIG. 8B, step 820 of FIG. 8C, and step 854 in FIG. 9A1.

FIG. 12C depicts an example process for checking a food profile to detect a food restriction or other incompatibility, in accordance with step 810 in FIG. 8B, step 820 of FIG. 8C, and step 854 in FIG. 9A1. The steps include: Access at least one nutritional parameter based on the food item/menu selection identifier, 1240; Access at least one food restriction or preference associated with the user based on the user identifier, 1242; Compare the at least one food restriction or preference associated with the user to the at least one nutritional parameter of the food item, 1244; No restriction or incompatibility—the food item/menu selection is recommended for the user, 1246; and Restriction or incompatibility—the food item/menu selection is not recommended for the user, 1248.

FIG. 12D depicts further details of step 1246 in FIG. 12C. The steps include: The food item/menu selection is recommended for the user based on compatibility with the nutritional parameters of the food/menu selection item, 1250; Inform user of the compatibility, 1252; Highlight the food item/menu selection, 1254; Degree of confidence in match is below threshold and severity of allergen is above threshold, 1256; and Instruct user to further investigate the food item/menu selection, 1258. One or both branches of the flowchart can be followed. Regarding steps 1256 and 125, as mentioned, probabilistic pattern recognition algorithms can provide a degree of confidence associated with a match, and if the degree of confidence is below a confidence threshold level, the user can be instructed to further investigate the food item/menu selection. For example, the confidence may be expressed as a percentage on a 0-100% scale, where 100% is absolutely confident. A high threshold level such as 90% can be set for a match to a food item containing a highly severe allergen. A moderate confidence threshold level such as 60% can be set for a match to a food item containing a moderately severe allergen. This allows the user to known when the identification of a food product may be in question and to take appropriate safeguards.

FIG. 12E depicts further details of step 1248 in FIG. 12C. The steps include: The food item/menu selection is not recommended for the user based on an incompatibility with at least one nutritional parameter of the food item/menu selection, 1260; Inform user of the incompatibility, 1262; Food item/menu selection is not recommended for the user because it contains an ingredient which is an allergen to the user, 1264; Inform user of allergen, 1266; Food item is not recommended for the user based on a violation of a dietary restriction, 1268; Inform user of the violation of the dietary restriction, 1270; Indicate an area of the store which has the substitute food item, based on a known arrangement of food items in different areas of the store, 1276; Suggest a substitute food item/menu selection which is recommended, 1274; At least partially block or erase a view by the user of the food item/menu selection (see FIGS. 14C, 14D, 14G, 18A and 18B), 1272; and Reconfigure menu to omit non-recommended menu selections, 1273 (see FIG. 18C). One or more of the branches of the flowchart can be followed.

FIG. 13 depicts a process for tracking a user's gaze direction and depth of focus such as for use in step 600 of FIG. 6 and step 704 of FIG. 7. Step 1300 involves tracking one or both eyes of a user using the technology described above. In step 1302, the eye is illuminated, e.g., using IR light from several LEDs of the eye tracking illumination 134 in FIG. 3A. In step 1304, the reflection from the eye is detected using one or more IR eye tracking cameras 134. In step 1306, the reflection data is provided to the processing unit 4. In step 1308, the processing unit 4 determines the position of the eye based on the reflection data, as discussed above. Step 1310 determines a gaze direction and a focal distance.

In one approach, the location of the eyeball can be determined based on the positions of the cameras and LEDs. The center of the pupil can be found using image processing, and ray which extends through the center of the pupil can be determined as a visual axis. In particular, one possible eye tracking technique uses the location of a glint, which is a small amount of light that reflects off the pupil when the pupil is illuminated. A computer program estimates the location of the gaze based on the glint. Another possible eye tracking technique is the Pupil-Center/Corneal-Reflection Technique, which can be more accurate than the location of glint technique because it tracks both the glint and the center of the pupil. The center of the pupil is generally the precise location of sight, and by tracking this area within the parameters of the glint, it is possible to make an accurate prediction of where the eyes are gazing.

In another approach, the shape of the pupil can be used to determine the direction in which the user is gazing. The pupil becomes more elliptical in proportion to the angle of viewing relative to the straight ahead direction.

In another approach, multiple glints in an eye are detected to find the Sd location of the eye, estimate the radius of the eye, and then draw a line through the center of the eye through the pupil center to get a gaze direction.

The gaze direction can be determined for one or both eyes of a user. The gaze direction is a direction in which the user looks and is based on a visual axis, which is an imaginary line drawn, e.g., through the center of the pupil to the center of the fovea (within the macula, at the center of the retina). At any given time, a point of the image that the user is looking at is a fixation point, which is at the intersection of the visual axis and the image, at a focal distance from the HMDD. When both eyes are tracked, the orbital muscles keep the visual axis of both eyes aligned on the center of the fixation point. The visual axis can be determined, relative to a coordinate system of the HMDD, by the eye tracker. The image can also be defined relative to the coordinate system of the HMDD so that it is not necessary to translate the gaze direction from the coordinate system of the HMDD to another coordinate system, such as a world coordinate system. An example of a world coordinate system is a fixed coordinate system of a room in which the user is located. Such a translation would typically require knowledge of the orientation of the user's head, and introduces additional uncertainties.

If the gaze direction is determined to point at a certain area in a scene, this indicates that the user is looking at the area. In response, the area could be highlighted by generating an auxiliary reality image, for instance. Moreover, the area and an associated object can be recognized by the forward facing camera of the HMDD, using image recognition techniques.

FIG. 14A depicts the scene portion 1002 of FIG. 10A. This can represent an image which is captured by the user's HMDD. In one approach, the complete image as captured is processed to identify the food items in the image. In another approach, one or more food items which are gazed at by the user are identified, the captured image is cropped to provide a cropped image which includes the gazed at food items, but not other food items in the scene portion 1002, such as in FIG. 14E. For example, a gaze detection system of the HMDD can be used as discussed in connection with FIG. 14B.

FIG. 14B depicts a composite image 1400 which includes the scene portion 1002 of FIG. 14A with the addition of augmented reality images 1402 or 1404. The augmented reality image 1402 is a circle which is centered about a gaze direction. It indicates that the user is gazing at the food item 1004 (Cake mix A). In one approach, the circle is visible to the user to provide feedback to the user about what food item is gazed at. In one approach, the objects within the gazed at area 1402 are identified using machine vision. For example, the outline of the package for food item 1004 can be detected and displayed as an augmented reality image 1404. The outline can be visible to the user to provide feedback to the user about what food item is gazed at. The augmented reality images 1402 or 1404 could alternatively represent images which are used to highlight a certain food item for which a recommendation is provided. For example, the food item 1004 could be a recommended food which is highlighted to the user.

FIG. 14C depicts a composite image 1410 which includes the scene portion 1002 of FIG. 14A with the addition of augmented reality images 1411-1413. The augmented reality image 1411 is an arrow which identifies and highlights the food item 1004 as a recommended food. The augmented reality image 1412 is an outline around the food item 1004 which identifies and highlights the food item 1004 as a recommended food. The augmented reality image 1413 is an "X" which at least partially blocks the user's view of the food item 1011 and which identifies and highlights it as a non-recommended or prohibited food. In addition to shapes, augmented reality images can have colors and other visual characteristics. An augmented reality image could be a video which provides a brief discussion of the food item, nutritional or shopping tips, or a commercial message regarding the food item. An augmented reality image can provide a coupon or other discount on the item, as well as information such as the price of the item and user reviews of it.

FIG. 14D depicts a composite image 1420 which includes the scene portion 1002 of FIG. 14A with the addition of augmented reality image 1421. The augmented reality image 1421 essentially erases the non-recommended food item 1011 for the user's view by blocking it with an opaque image. In this way, the user avoids seeing and purchasing the food item.

FIG. 14E depicts a cropped image 1430 corresponding to the area 1402 of FIG. 14B. The cropped image 1430 includes the food item 1004 and a portion 1431 of the food item 1004.

As mentioned, by processing a cropped image, a food item can be isolated and the amount of processing is reduced. However, in other cases, it is desirable to process all food items in the field of view.

FIG. 14F depicts a scene in which a user holds an individual food product. In this case, the captured image includes only one food item (Muffin mix B, 1011), so the user can focus on that one item and its nutritional parameters.

FIG. 14G depicts a composite image 1450 which includes the scene 1440 of FIG. 14F with the addition of augmented reality images 1451-1453. The augmented reality image 1451 in the form of an "X" (e.g., a red X) highlights to the user that the food item is not recommended. The augmented reality image 1452 provides a text message ("Contains nuts") informing the user of the reason why the food item is not recommended. The augmented reality image 1453 provides a text message ("As a substitute, try Earth brand muffins in aisle 4A") informing the user of a substitute food item which is recommended.

The augmented reality images 1452 and 1453 are projected to the user at defined locations relative to the food item 1011, e.g., left of center and in front of the food item, in the field of view of the user.

FIG. 14H depicts a composite image 1460 which includes the scene 1440 of FIG. 14F with the addition of an augmented reality image 1464 which provides nutritional parameters of the food item 1011. The augmented reality image 1464 provides a text message ("300 calories per serving") informing the user of a nutritional parameter of the food item. In this case, a recommendation is not necessarily provided, and the user decides whether the food item is desired. The nutritional parameter could also be presented in the context of similar food items. For example, data from different muffin mixes can be analyzed to determine that a range of calories per serving is 200-450. A muffin mix having 300 calories per serving can be identified as having an average amount of calories relative to the other muffin mixes. An augmented reality image can thus indicate how the nutritional parameter of the food item compares to similar food items in a class of food items (e.g., muffin mixes).

The augmented reality image 1464 is projected to the user at a defined location relative to the food item 1011, e.g., at the upper left of the food item, in the field of view of the user.

FIG. 15 depicts an example scenario in which an HMDD-wearing user 1500 looks at a menu 1510 in a restaurant. Consumers are increasingly interested in gaining nutritional information about meals in restaurants in order to be healthy and avoid allergens, and there is a trend toward government mandates in this area. Providing access to nutritional information by an HMDD would be helpful. Nutritional parameters of a meal can be derived from the recipe of the meal. Both ingredients and preparation techniques can be considered. In some cases, a restaurant menu indicates that a selection is heart healthy, low calorie, vegan or vegetarian, for instance. This may be written in text or represented by a logo.

A user 1500 wears the HMDD 2 having a front-facing camera 113 with a field of view within boundaries 1501-1504. A gaze direction is indicated by a line 1505. The menu 1510 includes selections in three categories. An appetizer is "Caesar salad," entrees are "Steak and potatoes," "Fish with vegetables" and "Pasta with sauce," and desserts are "Biscotti" and "gelato." Prices are also indicated. Next to the selection of "Fish with vegetables," three logos appear: HH (heart healthy), LS (low salt) and GF (gluten-free). Next to the selection of "Pasta with sauce," two logos appear: V (vegan) and HH (heart healthy). Next to the selection of "Gelato," one logo appears: GF (gluten-free). The logos can be letters, shapes such as a heart, a check mark for healthy heart, or other visible identifier such as quick response code or bar code. The HMDD can capture an image of the menu 1510 and process it (alone or with assistance from one or more servers) to identify the menu selections. In one approach, the text of a menu selection is identified from an image such as by using optical character recognition techniques. In one approach, a logo associated with a menu selection is identified from an image such as by using pattern recognition techniques. In one approach, the menu selections have other identifiers such as numbers which can be identified from an image.

Based on the identified menu selections, nutritional parameters of the selections can be looked up in a database, such as in FIGS. 16A and 16B, at the restaurant server 60 or other computing device. The nutritional parameters can be compared to a food profile (nutritional preferences/restrictions) of the user to provide a recommendation regarding the selections, and the recommendation can be conveyed to the user as an augmented reality image.

Menus can be provided in various formats. A menu which is personal to a diner may be made of paper. A paper menu may have embedded RFID tags which provide data identifying the selections to the HMDD. Menus which can be viewed by multiple diners at the same time include menu boards. A menu board can be computerized, such as with a digital menu board using an LCD display, or non-computerized, such as with a fixed wall mounted display. Digital menus which are viewed by one or more diners at a table are becoming increasing common. Such menus can be provided as table top computers, typically in a tablet format. Menus with computing, communication or data storage capabilities may be referred to as smart menus.

FIG. 16A depicts records of nutritional parameters of menu selections of the menu of FIG. 15A. The records provide a restaurant identifier, a restaurant location, selection names, a logo identifier, if any, associated with a selection, and ingredients of the selection. In some cases, an ingredient can be specified by a restaurant as a component of a meal, and the component can be cross-referenced to individual ingredients which are used in the component. For example, a component of the Caesar salad is dressing, and this can be cross-referenced to constituent ingredients such as mayonnaise, lemon juice, Worcestershire sauce, parmesan cheese and milk. As another example, a component of the steak/potatoes selection is gravy, which can be cross-referenced to constituent ingredients. This approach allows the restaurateur, for instance, to more easily describe a menu selection.

The example records are in the format of (selection id; selection name; logo id; ingredients) as follows: (Appetizer 1; Caesar Salad; n/a; Lettuce, egg, garlic, oil, croutons, dressing), (Entree1; Steak/potatoes; n/a; steak, potatoes, gravy), (Entree2; Fish/vegetables; HH, LS, GF; Salmon, carrots, green beans, lemon juice), (Entree3; Pasta/sauce; V, HH; Wheat flour, tomatoes, oil, salt), (Dessert1; Biscotti; n/a; flour, butter, sugar, almonds, anise seeds, salt), (Dessert2; Gelato; GF; milk, cream, egg yolk, sugar, salt).

FIG. 16B depicts records of additional nutritional parameters of menu selections of the menu of FIG. 15A. The records can be linked to those in FIG. 16A. The example records are in the format of (selection id; compatible with; incompatible with) as follows: (Appetizer1; n/a; Vegan, gluten-free), (Entree1; n/a; Vegan, heart healthy, low salt), (Entree2; Heart healthy, low salt, gluten-free; n/a), (Entree3; Vegan, heart healthy; Low salt), (Dessert1; n/a; gluten-free, nut allergy), and (Dessert2; gluten-free, nut allergy; lactose-intolerant).

FIG. 17A depicts a flowchart of a method in which a user views a menu in a restaurant. The steps include: View menu in restaurant, 1700 (see, e.g., FIG. 12A); Recognize menu selections, 1702 (see, e.g., FIG. 12B); Compare nutritional preferences/restrictions of user with nutritional parameters of menu selections, to identify compatible and incompatible selections, 1704 (see, e.g., FIG. 12C); and Highlight compatible selections, block or erase incompatible selections, or reconfigure menu to remove incompatible selections, 1706 (see, e.g., FIGS. 12D, 12E and 18A-C).

Alternatively, or additionally, step 1703 can be performed to display one or more nutritional parameters of one or more menu selections, such as: calories, fat, vitamins and minerals, points under a weight loss program and so forth (see FIG. 18D).

FIG. 17B depicts a flowchart of another method in which a user receives nutritional information in a restaurant. In this approach, the fact that a user is in or near a restaurant can trigger the display or other presentation (e.g., by audio) of information to the user regarding allergens and compatible or incompatible menu selections. A restaurant may upload to the cloud (e.g., the restaurant server) a listing of what menu items contain an allergen such as peanuts. Then, triggered by proximity from GPS or from stepping into a wireless bubble (e.g., a wireless hotspot such as an area within range of a RF signal such as in a WI-FI network), for instance, a peanut warning can be issued to the user or other action taken. Thus, the HMDD can determine that the user is at a restaurant based on location data or based on receiving a wireless signal of the restaurant.

For example, at step 1720, the user's HMDD (or other personal A/V apparatus) determines proximity to a restaurant. This can be based on a location such as GPS location of the HMDD matching a location of a particular restaurant. The determination can be made in conjunction with a server which periodically monitors the HMDD's location. At step 1722, the user's HMDD transmits the user identifier to a server. The server accesses nutritional preferences/restrictions of user based on the user identifier, and accesses nutritional parameters of menu selections of the restaurant the user is at. At step 1724, the server compares the nutritional preferences/restrictions of the user with the nutritional parameters of menu selections, to identify compatible selections, incompatible selections and/or an ingredient in menu which is an allergen to the user. At step 1726, the server transmits a corresponding message to user's HMDD. At step 1728, the user's HMDD informs the user of the compatible selections (e.g., "You are allergic to peanuts, but menu selection A is peanut-free"), incompatible selections (e.g., "Warning: You are allergic to peanuts and menu selection B contains peanuts") and/or use of an allergen in the menu (e.g., a message of "Warning: You are allergic to peanuts, and peanuts are used at this restaurant"). In another approach, at step 1730, the restaurant provides information which is not necessarily personalized to the user, but may be of general interest based on common allergies or other nutritional restrictions among the general public. Specifically, the user's HMDD receives message from restaurant server identifying the user of a potential allergen in the menu selections ("Warning: Peanuts are used at this restaurant"), and/relative to that allergen, compatible selections (e.g., "Menu selection A is peanut-free"), and/or incompatible selections ("Menu selection B contains peanuts"). In another approach, the restaurant provides messages tailored to other nutritional requirements such as "Menu selection A is low salt" or "Menu selection B is vegan." Many variations are possible.

FIG. 18A depicts a composite image 1800 which is based on the menu 1510 with the addition of augmented reality images 1802, 1804 and 1806 which highlight recommended menu selections, and augmented reality images 1808 and 1810 which block and provide information, respectively, regarding a non-recommended menu selection. The logos are omitted for clarity. For example, augmented reality image 1802 highlights "Caesar salad," augmented reality image 1804 highlights "Fish with vegetables," and augmented reality image 1801 highlights "Pasta with sauce." Augmented reality image 1808 blocks "Biscotti," and augmented reality image 1810 provides a reason for the blocking ("Warning: contains nuts.")

The augmented reality images are projected to the user at a defined location in the field of view of the user, relative to the location of at least one of the menu selections in the field of view of the user. For example, the augmented reality images 1802, 1804 and 1806 are bounding boxes of the text of the menu selections for "Caesar salad," "Fish with vegetables" and "Pasta with sauce," respectively.

A user can look at a menu on behalf of themselves or another person to obtain recommendations of menu selections. For example, a default can be to provide recommendations for the current user of the HMDD. The user can then enter a command to obtain recommendations of menu selections for another person. For example, a parent could look at the menu first to obtain their own recommendations, then look at the menu on behalf of a child to obtain child-specific recommendations. In the example of FIG. 8F, assume Jim is the parent and Sue is the child. Jim can obtain his recommendation and then enter a command such as: "Show recommendation for Sue" to obtain Sue's recommendations.

FIG. 18B depicts a composite image 1810 which is based on the menu 1510 with the addition of an augmented reality image 1822 which blocks or erases a non-recommended menu selection. In this case, the "Biscotti" is not recommended due to the allergen of nuts, and is blocked out or erased by an opaque area. The augmented reality image 1822 is projected to the user at a defined location in the field of view of the user, relative to the location of the menu selection for "Biscotti," e.g., in front of, and sized to completely block out, the menu selection.

FIG. 18C depicts a reconfigured menu which includes only recommended menu selections. For a computing device-based menu, such as a digital menu board or table top menu such as a tablet, the menu selections can be reconfigured such as to exclude non-recommended menu selections for a user. Some menu selections may have a neutral recommendation, e.g., they are neither recommended nor prohibited. These can also be excluded, in one approach. In this example, only the recommended selections of "Caesar salad," "Fish with vegetables" and "Pasta with sauce" are displayed.

In another approach, the menu is provided entirely as an augmented reality image, in which case the menu can be reconfigured such as to exclude non-recommended menu selections for a user. The HMDD can obtain the menu selections from a server which stores menu selections for the restaurant and filter the selections at the HMDD based on the user's food profile stored at the HMDD. Or, the HMDD can transmit a user identifier to the server which accesses the user's food profile (e.g., at the server), filters the menu selections based on the profile, and transmits the filtered menu selection to the HMDD for display.

Menu selections can be included which meet one or more nutritional preferences of a user such as heart healthy, fewer than a threshold number of calories per meal, vegan and so forth. In one approach, a complete meal comprising multiple selections is recommended. For example, the recommendation may be for one of the appetizers, one of the entrees and one of the desserts. A nutritional preference of a user may be a goal to have a complete meal which does not exceed 1,200 calories or a certain number of points in a weight loss program.

The computing device can communicate with a server (e.g., restaurant server or food recommendation server) and/or the HMDD via a network to obtain data which represents the recommendation.

FIG. 18D depicts a composite image 1860 which is based on the menu 1510 with the addition of augmented reality images 1862, 1864 and 1866 which provide nutritional parameters for menu selections. For example, augmented reality image 1862 states "1,200 calories" for the steak and potatoes selection, augmented reality image 1864 states "600 calories" for the fish with vegetables selection, and augmented reality image 1866 states "450 calories" for the pasta with sauce selection. The logos are omitted for clarity. Other information such as user reviews of a menu selection could also be provided.

The augmented reality images are projected to the user at a defined location in the field of view of the user, relative to the location of at least one of the menu selections in the field of view of the user. For example, the augmented reality images 1862, 1864 and 1866 are text boxes aligned to the right of the menu selections for "Caesar salad," "Fish with vegetables," and "Pasta with sauce."

The example computer systems illustrated in the figures include examples of computer readable storage media. Computer readable storage media are also processor readable storage media. Such media may include volatile and nonvolatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

The above discussion describes many different ideas. Each of these ideas can be combined with the other above-described ideas such that a personal A/V apparatus and accompanying system can be designed to implement all of the ideas discussed above, or any subset of the ideas.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for recommending an item to a user, the method comprising:

receiving image data of a scene from a camera, the scene comprises a particular item on a shelf, wherein the particular item is arranged in a known relative position to another item on the shelf, the particular item has a visual characteristic and is arranged in a certain location among a plurality of locations in a store, and the another item has a visual characteristic;

identifying the certain location based on a location of the user;

accessing a data source comprising an inventory of items in the store, each item in the inventory of items is cross-referenced to a location among the plurality of locations;

identifying candidate items in the inventory of items, the candidate items comprise items in the inventory which are cross-referenced to the certain location and excludes items in the inventory of items which are not cross-referenced to the certain location, and the candidate items are cross-referenced to image data;

performing a comparison which compares the visual characteristic of the particular item and the visual characteristic of the another item to the image data of the candidate items;

identifying one of the candidate items as a match to the particular item based on the comparison and the known relative position to the another item on the shelf, the one of the candidate items is cross-referenced to a parameter in the inventory;

obtaining a determination as to whether or not the particular item is recommended for the user based on a comparison of the parameter to a preference associated with the user; and informing the user as to whether or not the particular item is recommended for the user based on the determination.

2. The method of claim 1, wherein:
the plurality of locations comprises a plurality of aisles in the store;
the certain location of the user comprises a certain aisle in the store; and
each item in the inventory of items is cross-referenced to an aisle among the plurality of aisles.

3. The method of claim 1, wherein:
the camera comprises a front-facing camera of a head-mounted display device.

4. The method of claim 1, wherein:
the informing the user comprises causing an augmented reality projection system to project an augmented reality image to the user, based on the determination.

5. The method of claim 1, wherein:
the particular item comprises a food item; and
the parameter of the one of the candidate items comprises a nutritional parameter and the preference associated with the user comprises a nutritional preference.

6. A display device, comprising:
an augmented reality projection system;
a camera which receives image data of a scene, the scene comprises a particular item which is arranged in a known relative position to another item in a store, the particular item has a visual characteristic and is arranged in a certain location among a plurality of locations in the store, and the another item has a visual characteristic;
a location-detection system which determines a location of the display device; and
a control circuit in communication with the augmented reality projection system and the camera, the control circuit is configured to:
communicate the image data and the location of the display device to a server and, in response, receive from the server a determination as to whether or not the particular item is recommended for a user, the determination is based on a correspondence between a preference associated with the user and a parameter of a candidate item in an inventory of items in the store which is a best match to the visual characteristic of the particular item, wherein the best match is based on: (a) a comparison which compares the visual characteristic of the particular item and the visual characteristic of the another item to image data of the inventory of items, and (b) the known relative position to the another item in the store; and
cause the augmented reality projection system of the display device to project an augmented reality image to the user, based on the determination.

7.) The display device of claim 6, wherein:
in the inventory, the candidate item is cross-referenced to the certain location.

8. The display device of claim 6, wherein:
the plurality of locations comprises a plurality of aisles in the store;
the certain location comprises a certain aisle in the store; and
each item in the inventory of items is cross-referenced to an aisle among the plurality of aisles.

9. The display device of claim 6, wherein:
the candidate items are cross-referenced to the image data.

10. The display device of claim 6, wherein:
the particular item in the scene is a food item; and
the parameter of the candidate item comprises a nutritional parameter and the preference associated with the user comprises a nutritional preference.

11. The display device of claim 6, wherein:
the known relative position of the particular item to the another item comprises a known relative position of the particular item to the another item on a shelf in the store.

12. The display device of claim 6, wherein:
the another item is identified before the identifying the candidate item in the inventory as the match to the particular item.

13. A server, comprising:
a communication interface;
a database comprising an inventory of candidate items in a store, each candidate item in the inventory of candidate items is cross-referenced to an aisle among a plurality of aisles in the store and to image data of the candidate item;
a memory which stores program code; and
a control circuit associated with the communication interface, the database and the memory, the control circuit is configured to execute the program code to:
receive, via the communication interface, from a device of a user, an identification of an aisle in which the device is located and image data of a scene, the image data is from a camera of the device and identifies a visual characteristic of a particular item which is arranged in a certain aisle among a plurality of aisles in a store and a visual characteristic of another item which is arranged in the certain aisle,
identify the certain aisle based on the aisle of the device,
perform a comparison between the visual characteristic of the particular item and the visual characteristic of the another item to the image data of candidate items in the inventory which are cross-referenced to the certain aisle but not to candidate items in the inventory which are not cross-referenced to the certain aisle,
identify a candidate item in the inventory as a match to the another item,
based on the identifying of the candidate item and a known relative position of the another item to the particular item, identify a candidate item in the inventory as a match to the particular item;
obtain a determination as to whether or not the particular item is recommended for the user based on a comparison of a parameter and a preference associated with the user, the parameter is cross-referenced to the candidate item which is the match to the particular item, and inform the user as to whether or not the particular item is recommended for the user based on the determination.

14. The server of claim 13, wherein the control circuit executes the program code to:

receive, via the communication interface, from the device of a user, an identification of an area in which the user is looking, and narrow a number of the candidate items used in the comparison by excluding candidate items in the inventory which are outside the area.

15. The server of claim 13, wherein:

the informing the user comprises causing an augmented reality projection system of a head-mounted display device to project an augmented reality image to the user.

16. The server of claim 13, wherein:

the particular item comprises a food item; and the parameter of the one of the candidate items comprises a nutritional parameter; and the preference associated with the user comprises a nutritional preference.

* * * * *